(12) United States Patent
Van Der Velden et al.

(10) Patent No.: US 10,887,098 B2
(45) Date of Patent: Jan. 5, 2021

(54) SYSTEM FOR DIGITAL IDENTITY AUTHENTICATION AND METHODS OF USE

(71) Applicants: Alexander J. M. Van Der Velden, Atlanta, GA (US); Onoriode Malcolm Eruteya, Atlanta, GA (US)

(72) Inventors: Alexander J. M. Van Der Velden, Atlanta, GA (US); Onoriode Malcolm Eruteya, Atlanta, GA (US)

( * ) Notice: Subject to any disclaimer, the term of this patent is extended or adjusted under 35 U.S.C. 154(b) by 177 days.

(21) Appl. No.: 16/260,103

(22) Filed: Jan. 29, 2019

(65) Prior Publication Data
US 2019/0273607 A1 Sep. 5, 2019

Related U.S. Application Data

(63) Continuation-in-part of application No. 16/190,634, filed on Nov. 14, 2018.
(Continued)

(51) Int. Cl.
| | |
|---|---|
| *H04L 29/06* | (2006.01) |
| *H04L 9/08* | (2006.01) |
| *H04L 9/30* | (2006.01) |
| *G06K 7/14* | (2006.01) |
| *G06K 19/06* | (2006.01) |

(52) U.S. Cl.
CPC ............ *H04L 9/088* (2013.01); *G06K 7/1413* (2013.01); *G06K 7/1417* (2013.01); *G06K 19/06028* (2013.01); *G06K 19/06037* (2013.01); *H04L 9/30* (2013.01); *H04L 63/08* (2013.01)

(58) Field of Classification Search
CPC . H04L 9/088; H04L 9/30; H04L 63/08; H04L 9/3239; H04L 9/3247; H04L 2209/38; G06K 7/1417; G06K 19/06037; G06K 7/1413; G06K 19/06028
See application file for complete search history.

(56) References Cited

U.S. PATENT DOCUMENTS

| | | |
|---|---|---|
| 5,136,643 A | 8/1992 | Fischer |
| 6,401,206 B1 | 6/2002 | Khan et al. |

(Continued)

OTHER PUBLICATIONS

International Search Report and Written Opinion dated Jan. 24, 2019 for corresponding PCT Application No. PCT/US2018/061007.

*Primary Examiner* — Mahfuzur Rahman
(74) *Attorney, Agent, or Firm* — Matthew L. Grell; Jeffrey C. Watson; Grell & Watson Patent Attorneys LLC

(57) ABSTRACT

A cryptography system for digital identity authentication, and security including computer system or platform to enable users (individual, identity editor, requestor) using one or more user devices, having user data including a public identifier and a hardware key, a server, a private key on an individual user device and a matching public key on the server linked to individual user data on the server, an individual user device converts an individual user data into an individual user code on individual user device, editor user device receives individual user code and communicates individual user code to server, server pairs individual user device and editor user device by matching individual user code transmitted by said editor user device to user data on the server, and requestor to request verification of an identity of individual via issuance of a verification request and verified if match of decrypted public identifier in an identity contract.

32 Claims, 8 Drawing Sheets

Related U.S. Application Data

(60) Provisional application No. 62/586,237, filed on Nov. 15, 2017.

(56) References Cited

U.S. PATENT DOCUMENTS

| | | | |
|---|---|---|---|
| 6,904,416 | B2 | 6/2005 | Nassiri |
| 6,941,455 | B2 | 9/2005 | Aull |
| 7,028,181 | B1 | 4/2006 | McCullough et al. |
| 7,178,029 | B2 | 2/2007 | Ansper et al. |
| 7,178,030 | B2 | 2/2007 | Scheidt et al. |
| 7,475,250 | B2 | 1/2009 | Aull et al. |
| 8,769,622 | B2 | 7/2014 | Chang et al. |
| 9,002,018 | B2 | 4/2015 | Wilkins et al. |
| 9,397,839 | B2 | 7/2016 | Thoniel et al. |
| 9,722,790 | B2 | 8/2017 | Ebrahimi |
| 2002/0143711 | A1 | 10/2002 | Nassiri |
| 2003/0070072 | A1 | 4/2003 | Nassiri |
| 2004/0205243 | A1 | 10/2004 | Hurvig et al. |
| 2008/0209516 | A1 | 8/2008 | Nassiri |
| 2009/0049298 | A1 | 2/2009 | Hatter et al. |
| 2010/0161993 | A1 | 6/2010 | Mayer |
| 2011/0213700 | A1 | 9/2011 | Sant'Anselmo |
| 2013/0227286 | A1 | 8/2013 | Brisson |
| 2014/0122331 | A1* | 5/2014 | Vaish ............... G06Q 20/3674 705/41 |
| 2014/0143089 | A1* | 5/2014 | Campos ............... G07F 9/001 705/26.8 |
| 2014/0195425 | A1* | 7/2014 | Campos ............ G06Q 20/3674 705/41 |
| 2015/0356523 | A1 | 12/2015 | Madden |
| 2016/0239653 | A1 | 8/2016 | Loughlin-Mchugh et al. |
| 2016/0360403 | A1 | 12/2016 | Jordi et al. |
| 2016/0373257 | A1 | 12/2016 | Adrangi et al. |
| 2017/0041296 | A1* | 2/2017 | Ford ................... H04L 63/0421 |
| 2017/0374093 | A1* | 12/2017 | Dhar ................. H04L 63/1433 |

* cited by examiner

SYSTEM FOR DIGITAL IDENTITY AUTHENTICATION AND METHODS OF USE

CROSS-REFERENCE TO RELATED APPLICATIONS

To the full extent permitted by law, the present United States Continuation-in-Part Non-provisional Patent Application hereby claims priority to and the full benefit of, U.S. Non-Provisional application Ser. No. 16/190,634, filed on Nov. 14, 2018, entitled "System for Digital Identity Authentication and Methods of Use, priority to and the full benefit of, U.S. Provisional Application No. 62/586,237, filed on Nov. 15, 2017, entitled "Digital Identity Verification & Authentication System and Methods of Use," which is incorporated herein by reference in their entirety.

TECHNICAL FIELD

The disclosure relates generally to a cryptography and security system to identify and authenticate individuals and, more specifically, to improve, simplify, and facilitate digital identity authentication, verification, control, and ownership in a secure and efficient manner between a number of parties.

BACKGROUND

Prior to modern commerce and during the agrarian small town or village era, identification and authentication of an individual was relatively simple since everyone knew the other members of the community. In modern times and especially with the advent of the Internet, digital identification and authentication of an individual has become subject to fraud and identity thieves. Often victims of identity theft do not know something is stolen.

Every year approximately 16 million Americans are victim to identity theft and an estimated $16B in direct losses occur. The majority of identity theft victims do not suffer any financial losses; however, they do experience significant loss of time and costs to reestablish their identity with various institutions. According to the Federal Trade Commission (FTC), identity theft accounts for about $54 billion in direct and indirect costs to U.S. businesses and individuals every year. The Center of Strategic and Global studies estimated a startling $600 billion annually in 2018. The figures include direct and indirect costs such as those associated with lost revenue, customers, and lost opportunities.

The current problems find their origin in the application of military security technology without proper understanding of context of the original application as well as permissive personal data laws in the United States. The military broke verifying the identity of a remote individual, into a two part inquiry: i) the party or device performing the identification must have identifying information of the individual available to match or check against the information submitted by the individual; and ii) to secure and protect the identifying information of the individual from hacking, forgery, or fraudulent use by querying a central file from a trusted issuer of verified identification credentials.

By itself this identity verification process is incomplete since the risk of fraud in case of face-to-face is different than remote. Somebody can remotely provide identity verification information to you (e.g. Social Security Number), but that verification has nothing to do with the fact that the remote person is actually who you think he/she is. Many entities deploying a centralized computer system adopted this approach for on-line authentication without asking themselves whether they are an unconditionally trusted issuer of validated identification credentials.

This approach in practice works for the data center of the nuclear arsenal where this approach was developed because the network was only accessible by people with security clearances who have to submit to a face-to-face inspection entering the facility.

This approach in practice works for financial transactions because the person entering the transaction works for the bank and most often has no interest in falsifying transactions.

The principal weakness of this approach, both at military installations and financial institutions, occurs when insiders with security access to the facility assume the identity of other members with similar access (e.g. Edward Snowden) with stolen passwords.

Online services adopted the same identification technology by implementing a centralized computer facility which issues verified security credentials. However, they allowed the individual user to enter their own identity information without any face-to-face authentication.

Problem 1: identity theft problem and why it is not solved. Identity is determined using three factors: Who you are (your physical person), what you have (physical key), and what you memorized (password). For online identity typically passwords are used as a surrogate for what you can memorize. The problem is two-fold:

a—Once a password is established, it has to be known by two parties, you and the online service and has to be recorded and stored by the online service. Every internet service can be hacked, even those services run by security experts, so passwords can be stolen. Therefore passwords are no longer something that only you know. Fundamentally this is an unsolvable problem; therefore, passwords by themselves are not a viable way to establish identity. The same is true for pins, social security numbers, freeze pin numbers, mother's maiden name and any other identification info or answer to challenge question that is stored in databases. This problem is compounded by the fact that in the US the data in the database does not belong to the individual, but to the online company. So the individual cannot hold the online company liable for identity theft.

b—Once an account with passwords is established everybody is free to define his identity any way they see fit. Therefore it is very easy to impersonate somebody else using stolen identity data, or create a synthetic identity. Once you have done that, you can easily change this identity further to suit your needs (e.g. change address, email).

Known criminal uses of identity theft are:

Use of medical records to obtain drugs, pay for medical procedures, and take over identity more broadly.

Money laundering. Use your account to (try to) funnel criminal proceeds (e.g. drug sales)

Online impersonation. Using known video recordings, synthetic computer generated avatars of people (mainly executives) are created that engage in online meetings and authorize money transactions.

Gaining access to US critical infrastructure (cyberattack of potentially about 80,000 installations) through the potential impersonation of 1,000,000 key US individuals Establishing new credit in your name and stealing money Since the primary identity data (e.g. individual Social Security Numbers) of the majority of the US population is stolen, identity management compliance processes are becoming more dependent on data purchased from data aggregators (list of identity verification questions), which are not immediately retrievable by memory by the bona-fide person, such as exact bank balances or incorrect data, such as wrong dates-of-birth, expired driver's license number, and the like. Moreover, this data itself is likely in the hands of identity thieves as well, providing the identity thieves with the same path to identification and authentication as the bona-fide person. Additionally, there is no financial consequence if the service provider loses identity data or holds incorrect identity data rather the loss of time and costs to reestablish an individual's identity with various institutions lies with the individual.

Furthermore, apart from direct and indirect losses, there is an emotional aspect to being a victim to identity theft. There is nothing more aggravating than having your own identity rejected based on a flawed compliance process.

The cost in lost transactions due to false positives (rejected passwords) in fact far exceeds the direct losses. In addition, identity verification with online-services now relies on credentials (user id and passwords). Many individuals now have a hundred passwords that each need to be updated frequently. If administrators force end-users to use difficult to remember passwords they will typically have to store them separately in files which again decrease security, and if administrators don't do that, users pick passwords that can be easily guessed.

Moreover, whenever identity data, such as lists of identity verification questions and answers, driver's license number, government issued ID, Social Security number, date of birth, place of birth, maiden names, user IDs, passwords, and any hard to guess personal information such as "what was the name of your first pet" is centrally stored and resold, it again becomes subject to hacking.

Problem 2: identity recording errors and why it is not solved. When your invariant identity is recorded by third parties unknown to the owner of the identity, often errors are made. This can lead to bureaucratic confusion and thus additional cost and time. For instance inventors own formal name Alexander Jacobus Maria Van der Velden or common name Alex (first name) Van der Velden (last name) leads to a lot of problems. Errors cause my last name being Van, Der, Der Velden or just Velden. Sometimes the V is replaced by a B, so it becomes Belden or Balden due to misspelling. Also this sometime triggers undesired legal activity, an example is an erroneous change of the warranty deed from Alexander J. M. Van der Velden to Alex J. M. Van der Velden. This in turn caused a one week delay during a refinance because the nature of the new deed was not understood.

There is no reason why there should be so many instances of what is in fact invariant identity data. The problem is that every organization tracks their own version of this invariant information in databases by human data entry. Even under the best of circumstances humans may make a data entry error approximately every 30 words. A consistent recording and review of variant and invariant identity data for online identities would be most welcome.

Problem 3: Fraudulent profiles and why it is not solved. When you set up an online account, you are free to define your identity any which way you want. This may be desirable for some, but today a large fraction of online profile data is fake. In the case of online-dating applications, it is estimated that losses exceeding $200 million with dating fraud with only 15% reporting such losses. Moreover, it is further estimated that millions of social media accounts are not people but robots trying to manipulate sentiment and public opinion. Currently companies are using analytics to try to catch such scams, but this obviously isn't very successful as the bots can be trained to avoid being detected by analytics. This makes all of us vulnerable to manipulation and this may undermine our democracy itself.

There would be a market for a service whereby the profile data for online services would be actually representing the true identity data. If something like this were available honest people would use the service and scammers would be left in a smaller pool by themselves.

Problem 4: Fraudulent corporate roles and why it is not solved. Businesses define roles for their employees in order to control who can execute transactions on behalf of the business. The problem occurs when these roles are communicated informally within the business, such as through phone conversations or through badges. Such approaches are not traceable and are not secure means of executing transactions on the behalf of the business since badges, emails and phone calls can be easily faked. For example, in September 2015 criminals stole a freightliner truck and were able to enter Montreal port with fake identification. They then went on to load a container with 16 tons of silver on their truck and disappear. Three hundred and fifty security cameras did not prevent this theft.

Therefore, it is readily apparent that there is a recognizable unmet need for a system for digital identity authentication and methods of use designed to address at least some of the aspects of the problems discussed above. This system and method perform the appropriate functions to provide identification and authentication of an individual or user independent of the secrecy of the invariant identity data. Moreover, this system and method perform the appropriate functions to enable a user or individual to search for their identity or invariant identity data and determine if an identity theft has occurred or if an identity thief fraudulently registered them or created a fraudulent identity. Furthermore, this system and method perform the appropriate functions to enable a user or individual to freeze their identity until released for later bona-fide identification purposes of the user or individual.

BRIEF SUMMARY

Briefly described, in an example embodiment, the present system and method may overcome the above-mentioned disadvantages, and may meet the recognized need for a system for digital identity authentication including, in general, a system for digital identity authentication cryptography and security. The system for digital identity authentication may include a computer system or platform to enable roles (individual, identity editor, requestor) using invariant and variant identity data on an identity server which may use multi-factor authentication in order to support the following transactions: 1) The identity editor, who is paired with an individual, creates or verifies a public identifier of the individuals constructed from invariant identity data and signs/encrypts the individual's user data (including public identifier) with identity editor's private key (hardware) and links the public identifier to the encrypted data record; 2) a requestor obtains public identifier from the individual who wants to disclose their identity and executes an identity verification request (challenge) to an identity server, identity server sends identity verification request (challenge) to individual; 3) individual utilizes individual's private key (hardware) to sign/authenticate identity verification request (challenge); 4) identity server then uses the public key of the paired identity editor to decrypt the individuals data and to compare the public identifier to the decrypted public identifier of the individual. If the decrypted public identifier matches the one provided by the requestor, the identity is confirmed as well as the fact that the decrypted data belongs to this individual.

The system for digital identity authentication and methods of use may preferably include a) self-registration of identity users, creation of a public identifier, and notification if this identifier is used in an identity transaction; b) identity validation, verification and authentication (abbreviated "VV&A") by an identity editor—The identity user would fill in their profile and the identity editor would verify, correct, and validate the user's provided identity information. A notary is an example of a type of identity editor who typically performs the identity VV&A in person through visual inspection, the exchange of documents and third party data. Another type of identity editor could be an employer setting up roles inside a company (e.g. authorized to receive shipments or ship goods or authorized to file payroll taxes shipments and the like) or outside a company (e.g. supplier authorized to supply shipments, or customer authorized to receive shipments and the like) or authorize who can execute other transactions on the behalf of the business; c) There are also means for the identity editor to perform the VV&A remotely, for instance as an online notary. In addition to online document exchange and verification, authentication can also happen through a process whereby the user displays visual control (facetime) over assets known to be in his possession (e.g. house) and these assets can be validated (e.g. google street maps) as to be the address of the user. Remote VV&A can also take place through an automated service using an expert system and/or artificial intelligence; d) The concept of "public identifier" may be a unique identifier that is shared between users in order to locate an account record. Common public identifier examples are account number. However, account numbers do not address the problem of duplicates. One person could have multiple "duplicate" accounts. This might be ok if the all the accounts accessed to the rightful owner, but not if some of the accounts are "counterfeit". In the counterfeit case the accounts are owned by people pretending to be the registered account owner. This problem can only be addressed by making the account number uniquely tied to one single individual by the way it is constructed. This may be achieved here by using invariant data for a class of people (Such as Social Security Number in the USA or any National Identification Number for other countries) as the public identifier to locate the record. The use of the Social Security Number as a public record locator is probably not problematic because most Social Security numbers in the USA are already stolen (and therefore not secret), and a mechanism will be described whereby non-public identifiers will be used to link to public identifiers to hide the link between the Social Security number and a specific name if desired. In addition, in the case where compliance policies or other concerns ban the use of national identification numbers directly, an identifier could be created using a hash of the same number. Verification happens when the unencrypted public identifier is compared to the encrypted one. If the two are the same then the rest of the encrypted variant and invariant data is correct as well; e) Requestor scenarios—Whereby the requestor is a remote person, close person, remote server, close wireless server. These are all important use cases dealing with access to venues, access to online accounts and reception of packages; f) Identity theft insurance. It is an important aspect since it actually would cover the financial losses in the narrow case of a false positive of the system; g) Multiple individual-editor pairs for the same identity account. For instance, a notary can encrypt the identity contract and a medical administrator can link verified medical insurance to this contract. Therefore to retrieve specific records both the identifier and type of data need to be known; h) Multiple roles for people. When we discuss words like individual, identity editor or requestor in this patent application we refer to roles and not necessarily people. For instance, a medical records keeper who has the role of editor can request medical records from a medical records keeper in another office.

In an exemplary embodiment of a computer system to provide digital identity authentication, the computer system may include: a memory device for storing an instruction; a processor in communication with the memory and configured to execute the instruction on the processor, a server, one or more user devices, each of the one or more user devices having a user data, the user data including a public identifier and a hardware key identifying each the user device, each of the one or more user devices communicates the user data to the server, a private key on an individual user device and a matching public key on the server linked to the individual user data on the server, an individual user device converts an individual user data into an individual user code on the individual user device, an editor user device receives the individual user code and communicates the individual user code to the server, and the server pairs the individual user device and the editor user device by matching the individual user code transmitted by the editor user device to the user data on the server.

In an exemplary embodiment of a computer system to provide digital identity authentication, the computer system may include: a memory device for storing an instruction; a processor in communication with the memory and configured to execute the instruction on the processor; an identity server; one or more user devices; at least one hardware device; and an authentication protocol system with an encryption function having a hardware key and a software key, a private key and a public key. The private key may be generated from the hardware key and the software key may be stored on the at least one hardware device in communication with one of the one or more user devices. The public key may be generated from the private key and managed in a key infrastructure on the identity server. The public key may be restricted to use between paired user accounts or core individual account on the identity server.

In an exemplary embodiment of a method of providing digital identity authentication, the method utilizing a computer processor to execute an instruction may include the steps of: providing an identity server, one or more user devices, at least one hardware device; and utilizing an authentication protocol system with an encryption function having a hardware key and a software key, a private key and a public key. The private key may be generated from the hardware key and the software key may be stored on the at least one hardware device in communication with one of the one or more user devices. The public key may be managed in a key infrastructure on the identity server. The public key may be restricted to use between paired user accounts on the server.

In an exemplary embodiment of a computer-implemented method for digital identity authentication, the method comprising the steps of providing an identity server, one or more user devices, at least one hardware device; and utilizing an authentication protocol with an encryption function having a hardware key and a software key, a private key and a public key, the private key generated from the hardware key and the software key stored on the at least one hardware device in communication with one of the one or more user devices, the public key managed in a key infrastructure on the identity server, the public key is restricted to use between paired user accounts on the server.

In an exemplary embodiment further comprising the step of registering an individual defined by a public identifier of the individual and issuing the individual access to a first identity server account thereon the identity server protected by the authentication protocol using the hardware key and the software key of the individual to generate the private key and the public key of the individual.

In an exemplary embodiment further comprising the step of registering an identity editor defined by a public identifier of the identity editor and issuing the identity editor access to a second identity server account on the identity server protected by the authentication protocol using the hardware key and the software key of the identity editor to generate the private key and the public key of the identity editor.

In an exemplary embodiment further comprising the step of registering a requestor defined by a public identifier of the requestor and issuing the requestor access to a third identity server account on the identity server protected by the authentication protocol using the hardware key and the software key of the requestor to generate the private key and the public key of the requestor.

In an exemplary embodiment further comprising the step of pairing a selected the identity editor to the individual via pairing the first identity server account to the second identity server account as the paired user accounts, wherein the paired user accounts have access to the public key of the other.

In an exemplary embodiment wherein the identity editor further comprising the step of verifying an identity of the individual via review of an identity document of the individual, the identity editor defines a public identifier of the individual, and the system stores verified the identity information of the individual.

In an exemplary embodiment further comprising the step of creating the public identifier of the individual therefrom a country code and a national identification number, and a hash thereof.

In an exemplary embodiment further comprising the step of aggregating the public identifier of the individual with an identity information of the individual together with an identity information of the identity editor and to encrypt therewith the private key of said identity editor to form an encrypted identity contract linked to the public identifier of said individual.

In an exemplary embodiment wherein said identity editor further comprising the step of aggregating said encrypted identity contract of said individual with said identity editor public key and encrypting said aggregate with said public key of said individual to form an encrypted identity contract linked to said public identifier of said individual.

In an exemplary embodiment further comprising the step of enabling the individual to forward the public identifier and a requested type of the identity information of the individual to the requestor.

In an exemplary embodiment further comprising the step of enabling the requestor to request verification of an identity of the individual via issuance of an identity verification request to the identity server, and wherein the identity server evaluates a role of the requestor and the individual.

In an exemplary embodiment further comprising the step of sending the identity verification request to the individual.

In an exemplary embodiment further comprising the step of enabling the individual to utilize the private key of the individual to sign/authenticate the identity verification request.

In an exemplary embodiment further comprising the step of locating the private key of the individual of the paired user accounts using the public identifier of the individual, and decrypting the encrypted identity contract linked to the public identifier of the individual using the private key of the individual in the paired user accounts.

In an exemplary embodiment further comprising the step of locating the public key of the identity editor of the paired user accounts using the public identifier of the individual, and decrypting the encrypted identity contract linked to the public identifier of the individual using the public key of the identity editor in the paired user accounts.

In an exemplary embodiment further comprising the step of comparing the public identifier of the individual in the identity verification request to a decrypted public identifier in the identity contract and if a match, the individual and the identity information are verified.

In an exemplary embodiment further comprising the step of enabling the requestor to read a status of whether the public identifier of the individual in the identity verification request matches the decrypted public identifier in the identity contract.

In an exemplary embodiment further comprising the step of matching said identity verification request with said decrypted public identifier in said identity contract, then establishing a credential of said individual on another server securely connected to the identity server is TRUE.

In an exemplary embodiment further comprising the step of providing insurance thereto said individual and said requestor for a false positive identification of said individual.

In an exemplary embodiment further comprising the step of enabling the hardware key to be synchronized to a system clock.

In an exemplary embodiment further comprising the step of defining a specific type of the identity information and forwarding to the requestor, if the match.

In an exemplary embodiment further comprising the step of displaying publicly on a dashboard each the public identifier, provided the public identifier is not frozen.

In an exemplary embodiment further comprising the step of providing a non-public hidden identifier linked to the public identifier of the individual to the requestor.

Accordingly, a feature of the system to provide digital identity authentication and methods of use may include its ability to integrate multi-factor authentication—the first physical person factor authentication utilizes an identity editor (or other in person registered witness) to perform an interview of individual and review government issued identification of the individual and once verified then identity editor signs/encrypts the identity data and links it to the public identifier of the individual. Moreover, a rating (e.g. AA) may be added to the identifier to mark the quality of the identity editor's review of the correctness or accuracy of the public identifier and invariant data. This rating can later be used to automatically act on attempts of duplicate identifier and registrations.

Another feature of the system to provide digital identity authentication and methods of use may include its ability to integrate two additional factors—by using a hardware device capable of generating a hardware authentication key (like U2F, biometric or smart card) in combination with a password. U2F-using a USB (universal serial bus) or NFC (near field communication) device based on similar security technology found in smart cards. While initially developed by GOOGLE and YUBICO, with contribution from NXP Semiconductors, the standard is now hosted by the FIDO Alliance. In addition the hardware device can be verified (or optionally issued) by the identity editor to the individual to strengthen the first physical person factor. The online industry (e.g. GOOGLE) now proposes that 2 factor authentication is used (password+physical key). With strong two factor technology you can block somebody from taking over an account, but you cannot block an identity thief from setting up a new (and very secure) account in your name or to create a synthetic identity. This "new account fraud" is rising dramatically.

Still another feature of the system to provide digital identity authentication and methods of use may include its ability to provide authentication with phishing protection by tracking the individual and user origin, such as domain pages, URL, or ISP being utilized by the individual and user, and blocking unrecognized sources. Phishing is the attempt to obtain sensitive information such as usernames, passwords, and credit card details (and, indirectly, money), often for malicious reasons, by disguising as a trustworthy service in an electronic communication.

Yet another feature of system to provide digital identity authentication and methods of use may include its ability to integrate alternative or additional factor authentication—additional factor authentication utilizes a hardware device capable of generating a hardware authentication key (like U2F or biometric) and adding application ID to the private key to validate the application specific keys.

Yet another feature of the system to provide digital identity authentication and methods of use may include its ability to provide authentication with device cloning protection by incrementing a counter during relying party server authentication, and verifying that the counter is higher than the last authentication.

Yet another feature of the system to provide digital identity authentication and methods of use may include its ability to utilize public keys only shared on the identity server in the paired account between the identity editor and individual who wants authentication, rather than providing public keys to a broader group of users.

Yet another feature of the system to provide digital identity authentication and methods of use may include its ability to utilize a paired identity editor's private key to encrypt an individual's identity contract and the ability for this individual who is logged into his account to releases identity editor's public key in the identity server to a requestor sending a challenge to the individual to decrypt this identity contract.

Yet another feature of the system to provide digital identity authentication/signing and methods of use may include its ability to identify the individual attached to the message of the signed document whereby decryption herein also verifies the identity of the individual attached to the message of the signed document. Moreover, the message cannot be altered because it would invalidate the identity editor signature.

Yet another feature of the system to provide digital identity authentication/signing and methods of use may include its ability to encrypt the identity contract with the public key of the individual. The identity contract now has to be decrypted by the individual private key, which is only available via the individual hardware device and is not available in the system public key infrastructure. Therefore it will not be possible to extract this information by stealing the contract database and the identity editor public keys without the individual's private key and the individual private key is only available on the individual hardware device.

Yet another feature of the system to provide digital identity authentication and methods of use may include the ability of the identity editor to use the individual's public key in the paired account to encrypt identity information or any other personal records prior to signing the information with the identity editor private key to encrypt the identity contract. Thus, the identity contract will have to be decrypted by the individual private key and the individual private key is only available on the individual hardware device.

Yet another feature of the system to provide digital identity authentication and methods of use may include its ability to provide public keys to be used only on the identity server behind a firewall (so not disseminated), preventing identity thieves from using disseminated public keys to decrypt identity information or other private content.

Yet another feature of the system to provide digital identity authentication and methods of use may include its ability to utilize the paired identity editor's public key to decrypt the public identifier or identity information.

Yet another feature of the system to provide digital identity authentication and methods of use may be its ability to create non-public (hidden) versions of the public identifier which link to unencrypted public identity on the identity server. So a single individual can have a single public and multiple non-public identifiers. That may mean that the requestor would not have to know the identifier of who he/she is verifying and could even be an automated service. For instance, the face of the individual could be stored as a machine learning invariant and used as a non-public identifier. A camera at the requestor location would match up the face with this machine learning invariant representation which would tie to the public identifier. The feedback of the system would only show the result of the verification (yes/no). This could answer questions such as: are you older than 21? These verification criteria can be expanded broadly (e.g. current employment, absence of criminal records, character references etc.) to the degree that the identity editor could verify them. This system could also work without face recognition at the requestor site. The only thing required may be that hardware device connects to the requestor device and transmits a public or non-public identifier and that a requestor verifies the picture of his face that is returned from the identity server. The individual cannot borrow somebody else's multi-factor authorization device, because the stored face would not match up with his actual face standing in front of the requestor. With such a system, you can have privacy and security.

Yet another feature of the system to provide digital identity authentication and methods of use may include its ability to provide registration of minor or child identity. Therefore, a legal guardian individual (e.g. parents, guardians, agents) would be able to release identity information for another group (children, dependents) by using the dependents' public identifiers as non-public identifiers linked to the legal guardian account. If somebody tries to register child with the child's public identifier it would be a prohibited system operation. Non-public identifiers would not be available to users so this can only be a system operation. Later, if a dependent registers as an independent, the dependent's non-public identifier would be deleted and the identity information specific to the dependent could be moved to the new account.

Yet another feature of the system to provide digital identity authentication and methods of use may include its ability to allow the individual user to define specific conditions under which the authentication of identity verification request is granted automatically. For instance, for specific requestors over a specific time period. This could allow the individual's variant and certain invariant data as visible and searchable to a group of requestors under the condition that the identity editor public key can decrypt the record and establish that the public identifier matches the encrypted public identifier in the record. This is an important use case for online profiles. As such, there would be no identity transaction with the individual connected to his account in the loop, just a verified profile.

Yet another feature of the system to provide digital identity authentication and methods of use may include its ability to utilize delivery persons (USPS, FEDEX, UPS, etc.) to visit the location of the user's residence and to perform the role of identity editor.

Yet another feature of the system to provide digital identity authentication and methods of use may be its ability to utilize a biometric device (such as a FITBIT) to uniquely identify the wearer or individual.

Yet another feature of the system to provide digital identity authentication and methods of use may be its ability to provide the identity server in a container and deployed as an identity license server to a third party service.

Yet another feature of the system to provide digital identity authentication and methods of use may include its ability to provide digital content that is marked with a digital signature (aka digital watermark) by the identity server including name, and/or public identifier of the verified person who uploaded the content.

Yet another feature of the system to provide digital identity authentication and methods of use may include its ability to provide content that can only be decrypted by a verified and logged in owner-user of the content.

Yet another feature of the system to provide digital identity authentication and methods of use whereby the watermark is encrypted by the identity server and can be decrypted by the identity server as a service. (E.g. by news media to verify authenticity).

Yet another feature of the system may include to provide digital identity authentication and methods of use whereby content is co-authenticated by the identity user and another party (e.g. legal document).

Yet another feature of the feature the system to provide digital identity authentication and methods of use may include the ability to provide a single identity for users, individuals, notaries, requestor and the like, rather than a sign-on for each on-line platform and service.

Yet another feature of the feature the system may be to provide authentication services for an external server which can be protected by its own authentication protocol. In this case the requestor is the identity server itself and the individual will have to provide his public identifier to the identity server. Upon successful identity verification on the identity server, the identity server can connect to the outside server using the outside server credentials. These outside server credentials can be automatically managed to increase security, including the use of software keys (username/passwords) that can be automatically changed as well as identifying hardware on the identity server. In addition, the verified identity on the identity server can give individuals access to organizational accounts without disclosing the credentials of these accounts. For instance, certain individuals, who are employed by a company, can have the right to file tax or payroll returns on behalf of the company on an IRS server. This will also protect the organization from password sharing or stealing between individual employees (Snowden scenario). It would also allow existing systems to operate more security with existing username password protection.

Yet another feature of the system to provide digital identity authentication and methods of use may include the ability to create digital identity authentication software or platform and make it downloadable as an app for users, individuals, notaries (4.5 million in USA), requestors, and the like.

Yet another feature of the system to provide digital identity authentication and methods of use may include the ability to create digital identity authentication software smartphone app whereby specialized smartphone hardware is the hardware key.

Yet another feature of the system to provide digital identity authentication and methods of use may include the ability to utilize a purely biometric identification (like facial). The hardware key is the motherboard with the face recognition sensor. The software key is generated from sample images of your face itself during setup of the phone.

Yet another feature of the system to provide digital identity authentication and methods of use may include the ability to provide identity editors with the ability to register an editor account and receive a password via mail, email, text, in person during an on-site verification. Password is used to generate random private identity editor key in combination with other account security features such as U2F.

Yet another feature of the system to provide digital identity authentication and methods of use may include the ability to provide the population at large (users, individuals, identity editors, requestor and the like) a means to search for their identity using their fixed format public identifier (e.g. Social Security number, other identifier, or its hash) to see if someone fraudulently registered them or, proactively they may register to temporarily freeze (frozen) their identity. This means that their public identifier can no longer be used as identification in this system for transactions involving identity theft. Moreover, this brings a large part of the population into the system initially wherein public identifiers (such as social security numbers) may be initialized in the platform in a freeze status until user registers an active account. This freeze process can also be done with remote identity editor services. Any identity freeze conflicts based on the same public identifier can be resolved through hierarchical processes of in-person verification.

Yet another feature of the system to provide digital identity authentication and methods of use may include the ability to provide the service for free to requestors and paid for by individuals who seek to protect their identity.

Yet another feature of the system to provide digital identity authentication and methods of use may include the ability to provide single "identity transactions" instead of the current practice of establishing broad everlasting credentials based on invariant information such as drivers licenses. This means that fraud will most often be limited to a single transaction for a single person by compromising the identity editor function. However, such compromised transactions will be flagged and then can be promptly investigated and remedied by issuing a new identity contract.

Yet another feature of the system to provide digital identity authentication and methods of use may include the ability to be applicable to large scale identity verification to facilitate transactions between individuals and company customer support and sales.

Yet another feature of the system to provide digital identity authentication and methods of use may include the ability to utilize variations in the integration of known encryption technology for authentication, message integrity, encryption, encryption key exchanges systems and methods, U2F, block chain, and other like digital identity, digital signature, digital document, or other secure communication and data exchange protocols, and the like function and manner of operation, assembly and use, are intended to be encompassed by the present disclosure.

Yet another feature of the system to provide digital identity authentication and methods of use may include its ability to provide individual identity and authentication to tax service or payroll entities like INTUIT, ADP (taxpayer W-2 information), or H&R BLOCK, and/or Internal Revenue Service (IRS) to prevent identity theft from fraudulent tax returns where scammers claim other people's refunds. Moreover, if you are a victim of ID theft, it is harder to pay your taxes online due to a more stringent filing process. Cybercriminals have basic information on millions of Americans, such as names, Social Security numbers, addresses, email accounts and other like identity data.

Yet another feature of the system to provide digital identity authentication and methods of use may include its ability to provide individual identity and age and residency authentication to online gaming, age restricted products and FOSTA-SESTA (age verification technologies to protect children online).

Yet another feature of the system to provide digital identity authentication and methods of use may include its ability to provide individual identity and authentication vendors ("know your vendor") and registers bona fide sales people of products and services for companies. Companies get lots of calls with people trying to sell them something or people claiming relationships to existing vendors. Some of these callers are scammers trying to convince you to pay invoices to fraudulent bank accounts.

Yet another feature of the system to provide digital identity authentication and methods of use may be its ability to meet HIPAA Privacy Rules for Patients' Rights, including HIPPA 3b and 3d to prevent medical identity theft, keep treatment and diagnosis as accurate as possible, and while maintain privacy and security of patient. Patient has the right to access their own medical records, and request their records across hospitals and doctors, as well as record forwarding from one doctor to the next, so patient both individual and requestor role and will have access to his data across medical service providers. Patient may register their insurance data as an additional piece of variant identity data via identity editor. Medical administrator's may author, add to record, and sign/encrypt the data with their private key, and may act in the identity editor role. Patient may want to provide other medical doctors, pharmacy, hospital administrator, or lawyers' (requestor) access to data, so in this case other medical doctors/lawyers/insurance companies are requestors. In the case whereby somebody other than the patient owns the data (covered entity) then the paired account is between the doctor and this covered entity. Medical identity theft occurs when someone uses an individual's name and personal identity to fraudulently receive medical services, prescription drugs and/or goods, including attempts to commit fraudulent billing. Medical identity theft incidents increased 21.7 percent in 2017, and it is estimated that 1% of procedures in the USA are billed to fake person using somebody else's insurance. Medical identity theft can cause delays in treatment, misdiagnosis and inappropriate care. The health data of the imposter is merged with the identity of the real patient, creating serious inaccuracies in health data. Prescription drug loopholes can be closed by adding medicine delivery where requestor (pharmacy or online pharmacy and delivery person) authenticates individual prior to release of prescription.

Yet another feature of the system to provide digital identity authentication and methods of use may include the ability to provide remote sign-off for package delivery from one unique individual (public identifier) to another where individual signs off remotely to where the package gets delivered by the delivery service.

Yet another feature of the system to provide digital identity authentication and methods of use may include the ability to provide remote sign-off or to sign a transaction between one unique individual (public identifier) and another(s) where the individual signs the transaction remotely.

Yet another feature of the system to provide digital identity authentication and methods of use may include its ability to provide requestor (delivery person) on behalf of Seller (AMAZON, WALMART, or the like) authentication of individual (Buyer) prior to release of goods/services and delivery confirmation that goods/services were shipped and delivered.

Yet another feature of the system to provide digital identity authentication and methods of use may include its ability to provide e-commerce site identification and verification of buyer at checkout and verify buyer's identity and address, as well as forwarding credit card strings for payment and shipments of goods/services.

Yet another feature of the system to provide digital identity authentication and methods of use may include its ability to provide in-store identification and verification of buyer and verify buyer's identity or buyer's authorized agent to accept goods/services on their behalf.

Yet another feature of the system to provide digital identity authentication and methods of use may include its ability to provide in-store identification and verification of buyer and verify buyer's age and residency for restricted products such as alcohol, tobacco, firearms (and check felon database), lottery tickets and the like.

Yet another feature of the system to provide digital identity authentication and methods of use may include its ability to provide verification and authentication for banking or other financial transactions, such as ATM usage.

Yet another feature of the system to provide digital identity authentication and methods of use may include its ability to provide verification and authentication for voting or voter registration.

Yet another feature of the system to provide digital identity authentication and methods of use may include its ability to provide verification and authentication for credit reporting agencies.

Yet another feature of the system to provide digital identity authentication and methods of use may include its ability to provide verification and authentication for gambling, alcohol, vaping, marijuana, and other age identification and verification services.

Yet another feature of the system to provide digital identity authentication and methods of use may include its ability to provide verification and authentication for online ads and adult content, services, or products.

Yet another feature of the system to provide digital identity authentication and methods of use may include its ability to provide voter authentication, verification, and security. The system may authenticate a user before casting a vote or absentee ballot with a user's updated or recent identity contract. Display thereon a voter dashboard an increment in candidates tally when user's vote is cast to verify an accurate vote count to the user. Moreover, the digital identity authentication system may enable secure mobile and/or online voting to enable all citizens to easily cast their vote remotely while preventing unauthorized or fraudulent voters from participation.

Yet another feature of the system to provide digital identity authentication and methods of use may include its ability to provide authentication around an editor hardware device with a scanning function (such as a DIAD) and a smart phone displaying the user data in possession of the user.

It can also be that the identity editor user account really belongs to or is linked to the person in possession of the scanner device. The key is the user data and device hardware identification can be turned into a hash which is read directly by the operator of the scanner from the user device. This ties the information on the user device and the hardware on which the device is shown together, so now possession of the user hardware device can be used for authentication. This enables reduced development, deployment, and operational cost to since editors will not need any special training or modified hardware. In the absence of the scanner device, an editor can also manually type in the code. Moreover, this functionality can be performed remotely as well, during a video conference as scanner codes can be visually transmitted.

Yet another feature of the system to provide digital identity authentication and methods of use may include its ability to generate public private key pairs after the barcode or QR code scanning process.

Yet another feature of the system is to provide electronic consent from individuals for data transactions to comply with the Privacy legislation such as European GDPR (General Data Protection Regulation) or the California Consumer Privacy Act. In this application the data is associated with the person's public identifier, and the public identifier is used by the requestor wanting to complete the data transaction by connecting with the individual associated with the data and to obtain their permission or consent to use the data for any other purpose other than the original purpose.

Yet another feature of the system to provide digital identity authentication and methods of use may include its ability to enable a user to verify a person asking for access or entry to a locked location, space, or compartment and once the person is verified either provide a temporary digital access key to the person to unlock the locked location, space, or compartment or user may remotely open or unlock the locked location, space, or compartment.

These and other features of the system to provide digital identity authentication and methods of use will become more apparent to one skilled in the art from the following Detailed Description of exemplary embodiments and Claims when read in light of the accompanying drawing Figures.

BRIEF DESCRIPTION OF THE DRAWINGS

The present system to provide digital identity authentication and methods of use will be better understood by reading the Detailed Description of exemplary embodiments with reference to the accompanying drawing figures, in which like reference numerals denote similar structure and refer to like elements throughout, and in which.

Figure 1:
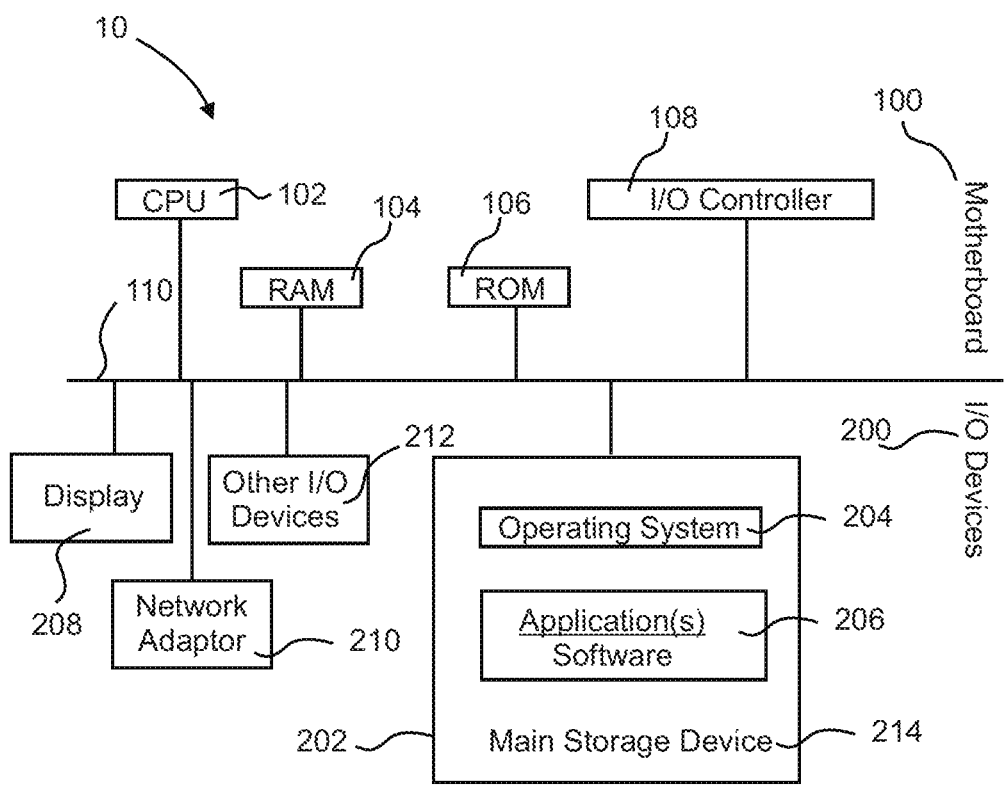
FIG. 1 is a block diagram of a computer system according to select embodiments of the present disclosure of a bet information advisor platform.

It is to be noted that the drawings presented are intended solely for the purpose of illustration and that they are, therefore, neither desired nor intended to limit the disclosure to any or all of the exact details of construction shown, except insofar as they may be deemed essential to the claimed invention.

DETAILED DESCRIPTION

In describing the exemplary embodiments of the present disclosure, as illustrated in FIGS. 1-5, specific terminology is employed for the sake of clarity. The present disclosure, however, is not intended to be limited to the specific terminology so selected, and it is to be understood that each specific element includes all technical equivalents that operate in a similar manner to accomplish similar functions. The claimed invention may, however, be embodied in many different forms and should not be construed to be limited to the embodiments set forth herein. The examples set forth herein are non-limiting examples, and are merely examples among other possible examples.

In order to understand the present disclosure certain variables and terms need to be defined, such as "Identity Verification", "Identity Validation" and "Identity Authentication", which are often used interchangeably, but actually have subtle differences in meaning.

Identity (data) Validation means ensuring that identity data represents real data, for example ensuring that a particular Social Security Number has not been issued by the Social Security Administration to another individual.

Identity (data) Verification means ensuring that identity data is associated with a particular individual, for example matching date of birth and address to an individual's name.

Identity (person) Authentication refers to a process of determining that an individual is who they claim to be by a comparison of a passport picture (or other government issued document and credentials) with visual inspection of the person handing over the passport.

As will be appreciated by one of skill in the art, the present disclosure may be embodied as a method, data processing system, or computer program product. Accordingly, the present disclosure may take the form of an entirely hardware embodiment, entirely software embodiment or series of instructions or an embodiment combining software and hardware aspects. Furthermore, the present disclosure may take the form of a computer program product on a computer-readable storage medium having computer-readable program code means embodied in the medium. Any suitable computer readable medium may be utilized, including hard disks, ROM, RAM, CD-ROMs, electrical, optical, magnetic storage devices and the like.

The present disclosure is described below with reference to flowchart illustrations of methods, apparatus (systems) and computer program products according to embodiments of the present disclosure. It will be understood that each block or step of the flowchart illustrations, and combinations of blocks or steps in the flowchart illustrations, can be implemented by computer program instruction(s) or operation(s). These computer program instructions or operations may be loaded onto a general purpose computer, special purpose computer, or other programmable data processing apparatus to produce a machine, such that the instructions or operations, which execute on the computer or other programmable data processing apparatus, create means for implementing the functions specified in the flowchart block or blocks/step or steps.

These computer program instructions or operations may also be stored in a computer-usable memory that can direct a computer or other programmable data processing apparatus to function in a particular manner, such that the instructions or operations stored in the computer-usable memory produce an article of manufacture including instruction means which implement the function specified in the flowchart block or blocks/step or steps. The computer program instructions or operations may also be loaded onto a computer or other programmable data processing apparatus (processor) to cause a series of operational steps to be performed on the computer, provide software as a service, or other programmable apparatus (processor) to produce a computer implemented process such that the instructions or operations which execute on the computer or other programmable apparatus (processor) provide steps for implementing the functions specified in the flowchart block or blocks/step or steps.

Accordingly, blocks or steps of the flowchart illustrations support combinations of means for performing the specified functions, combinations of steps for performing the specified functions, and program instruction means for performing the specified functions. It should also be understood that each block or step of the flowchart illustrations, and combinations of blocks or steps in the flowchart illustrations, can be implemented by special purpose hardware-based computer systems, which perform the specified functions or steps, or combinations of special purpose hardware and computer instructions or operations or provided as computer application, software, software platform, software as a service.

Computer programming for implementing the present disclosure may be written in various programming languages, database languages, and the like. However, it is understood that other source or object oriented programming languages, and other conventional programming language may be utilized without departing from the spirit and intent of the present disclosure.

Moreover, hardware-based computer systems, which perform the specified functions or steps, or combinations of special purpose hardware and computer instructions or operations or provided as computer application, software, software platform, software as a service for authentication and identification communication, including biometric authentication, between an authentication provider, a service provider or requestor, and a consumer or user, for facilitating authentication and identification communication, including biometric authentication, between an authentication provider, a service provider or requestor, and a consumer or user, for providing alerts and notifications regarding potential fraud and potential identity theft, for arranging secure authentication of personal data or the ability to watermark users data (marked with a digital signature including name, and/or invariant of the verified user who uploaded the content), such as data in requests to open banking, credit, credit card, loan, financial, telecommunications and utility accounts; DNA services, honest advertising, honest news (true identification of reports to news stories to prevent fake news)-publishing content under user's name/invariant, protecting generic data/information, individual is allowed to view/share/encrypt/decrypt their data on a 3rd party system) including FACEBOOK, YAHOO, GOOGLE DRIVE, DROP BOX, IRS, IRS's individual taxpayer authentication numbers, and the like.

Moreover, computer programming and hardware for implementing the present disclosure may be in the form of a piece of licensing hardware and/or software or deployed as an identity license server to 3rd parties who can then use it to register, identify and authenticate individuals or individual access.

Referring now to FIG. 1, there is illustrated a block diagram of a computer system 10 that provides a suitable environment for implementing embodiments of the present disclosure. The computer architecture shown in FIG. 1 is divided into two parts—motherboard 100 and the input/output (I/O) devices 200. Motherboard 100 preferably includes subsystems or processors to execute an instruction(s) such as central processing unit (CPU) 102, a memory device, such as random access memory (RAM) 104, input/output (I/O) controller 108, and a memory device such as read-only memory (ROM) 106, also known as firmware, which are interconnected by bus 110. A basic input output system (BIOS) containing the basic routines that help to transfer information between elements within the subsystems of the computer is preferably stored in ROM 106, or operably disposed in RAM 104. Computer system 10 further preferably includes I/O devices 202, such as main storage device 214 for storing operating system 204 and instructions or application program(s) 206, and visual display or monitor, such as display 208 for displaying visual output, and other I/O devices 212 as appropriate. Main storage device 214 preferably is connected to CPU 102 through a main storage controller (represented as 108) connected to bus 110. Network adapter 210 may allow the computer system to send and receive data through communication devices or any other network adapter capable of transmitting and receiving data over a communications link that is either a wired, optical, or wireless data pathway. It is recognized herein that central processing unit (CPU) 102 performs instructions, operations or commands (instructions or application program(s) 206) stored in ROM 106 or RAM 104.

Many other devices or subsystems or other I/O devices 212 may be connected in a similar manner, including but not limited to, devices such as microphone, speakers, flash drive, CD-ROM player, DVD player, printer, main storage device 214, such as hard drive, and/or modem each connected via an I/O adapter. Also, although preferred, it is not necessary for all of the devices shown in FIG. 1 to be present to practice the present disclosure, as discussed below. Furthermore, the devices and subsystems may be interconnected in different configurations from that shown in FIG. 1, or may be based on optical or gate arrays, or some combination of these elements that is capable of responding to and executing instructions or operations. The operation of a computer system such as that shown in FIG. 1 is readily known in the art and is not discussed in further detail in this application, so as not to overcomplicate the present discussion.

Figure 2:
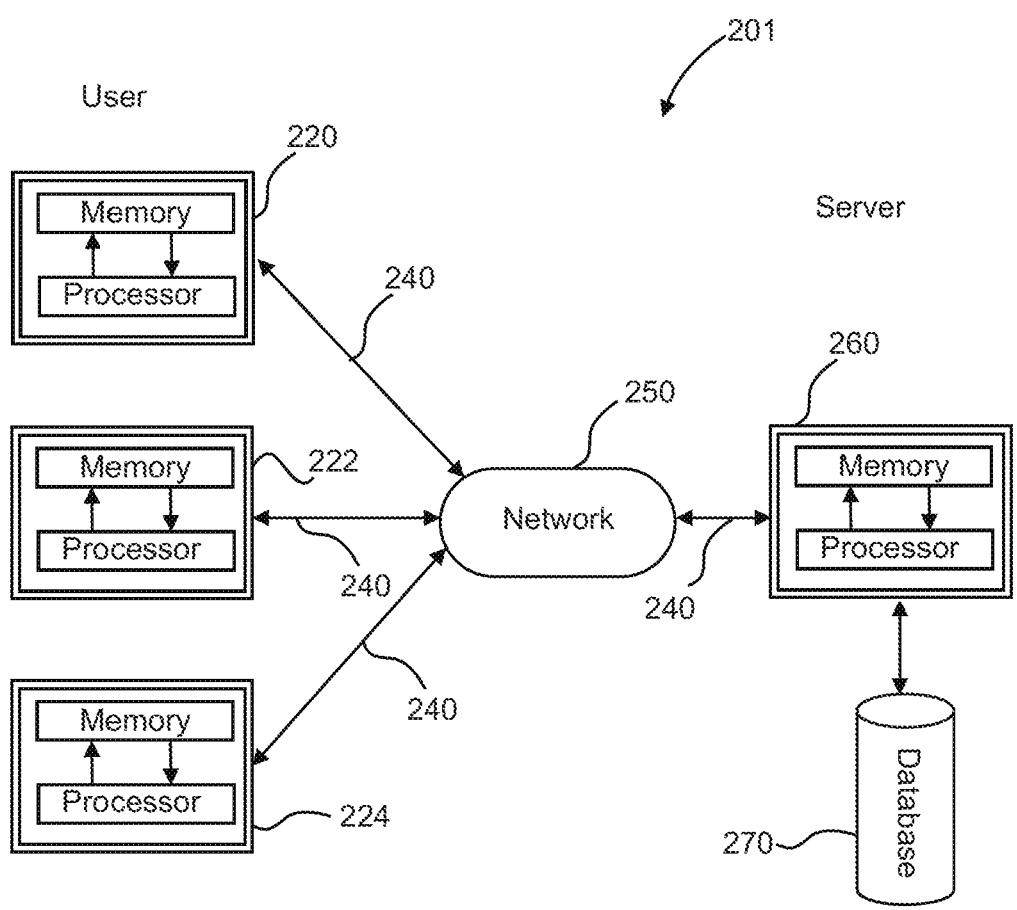
FIG. 2 is a block diagram of select embodiments of a communications system implemented by the computer system in FIG. 1.

Referring now to FIG. 2, there is illustrated a diagram depicting an exemplary communication system or platform 201 in which concepts consistent with the present disclosure may be implemented. Examples of each element within the communication system 201 of FIG. 2 are broadly described above with respect to FIG. 1. In particular, the server system 260 and user 220, 222, 224 have attributes similar to computer system 10 of FIG. 1 and illustrate one possible implementation of computer system 10. Communication system 201 preferably includes one or more user 220, 222, 224, one or more server system 260, and network 250, which could be, for example, the Internet, public network, private network or cloud. User 220, 222, 224 each preferably includes a computer-readable medium, such as random access memory, coupled to a processor, and may be a standalone system, such as a kiosk. The processor, CPU 102, executes program instructions or operations stored in memory. Communication system 201 typically includes one or more user 220, 222, 224. For example, user 220, 222, 224 may include one or more general-purpose computers (e.g., personal computers), one or more special purpose computers (e.g., devices specifically programmed to communicate with each other and/or the server system 260), a workstation, a server, a device, a digital assistant or a "smart" cellular telephone or pager, a digital camera, hand held data capture and communications device, such as Delivery Information Acquisition Device (DIAD) or Power Pad, a component, other equipment, or some combination of these elements that is capable of responding to and executing instructions or operations and capturing and transmitting data.

Similar to user 220, 222, 224, server system 260 preferably includes a computer-readable medium, such as random access memory, coupled to a processor. The processor executes program instructions stored in memory. Server system 260 may also include a number of additional external or internal devices, such as, without limitation, a mouse, a CD-ROM, a keyboard, a display, a storage device and other attributes similar to computer system 10 of FIG. 1. Server system 260 may additionally include a secondary storage element, such as database 270 for storage of data and information. Server system 260, although depicted as a single computer system, may be computer-implemented as a network of computer processors. Memory in server system 260 contains one or more executable steps, program(s), algorithm(s), or application(s) 206 (shown in FIG. 1). For example, the server system 260 may include a web server, information server, application server, one or more general-purpose computers (e.g., personal computers), one or more special purpose computers (e.g., devices specifically programmed to communicate with each other), a workstation, a distributed system, a chain of server-less microservices processors, a custom built hardware module, or other equipment, or some combination of these elements that is capable of responding to and executing instructions or operations.

It is contemplated herein that communication system 201 may be implemented on a custom built hardware device.

Communications system 201 is capable of delivering and exchanging data between user 220, 222, 224 and a server system 260 through communications link 240 and/or network 250. Through user 220, 222, 224, users can preferably communicate over network 250 with each other user 220, 222, 224, and with other systems and devices, such as server system 260, to electronically collect, transmit, manipulate, display, store, print and/or view bettor data utilizing betting level of profitability system 301 (see FIG. 3). Communications link 240 typically includes network 250 making a direct or indirect communication between the user 220, 222, 224 and the server system 260, irrespective of physical separation. Examples of a network 250 include the Internet, cloud, analog or digital wired and wireless networks, radio, television, cable, satellite, and/or any other delivery mechanism for carrying and/or transmitting data or other information, such as to electronically transmit, store, print and/or view. The communications link 240 may include, for example, a wired, wireless, cable, optical or satellite communication system or other pathway.

It is contemplated herein that RAM 104, main storage device 214, and database 270 may be referred to herein as storage device(s) or memory device(s).

In order to understand the present disclosure certain user terms need to be defined. Individual means a person or entity who wants to disclose their true (identity editor certified) identity to a requestor. Identity server means a computer program that manages access to a centralized resource or service in a network. Identity editor means a person or automated service authorized to perform certain legal formalities, especially to identify an individual, draw up or certify contracts, deeds, and other documents for use in other jurisdictions. A public identifier is a unique invariant data string (such as Social Security Number) which denotes the single individual who is a member of a class of people (such as citizens of a country) that is to be identified individually. Requestor means a person or entity or automated service who wants to verify if the encrypted (identity editor certified) identity matches the public identifier or an automated login server-response challenge, such as a computer program or system that verifies if the encrypted (identity editor certified) public identifier matches the public identifier. A multi factor authentication protocol requires not only a password and username but also something that only that user has on them—such as a physical token (hardware device). U2F means "universal two factor", a specific 2FA encryption standard technical implementation.

Public keys are one half of the mathematically-related pairs consisting of private key and public key pairs in asymmetric encryption for all users. They are managed in a key infrastructure which is a set of roles, policies and procedures needed to create, manage, distribute, use, store and revoke digital certificates (ownership keys) and manage encryption. In our case, the key infrastructure is highly restrictive so that only paired user accounts distribute public keys to each other within identity server, as in paired accounts between an identity editor and an individual who have formed a business relationship in the system for digital identity authentication. Specifically, the key infrastructure manages the identity editor key in order to decrypt the paired individual's public identifier as part of the authentication process.

Asymmetric cryptography, also known as public key cryptography, uses public and private keys to encrypt and decrypt data. The keys are simply large numbers that have been paired together but are not identical (asymmetric). One key in the pair, a public key, can be shared (The other key in the pair is kept secret; it is called the private key. Either of the keys can be used to encrypt a message; the opposite key from the one used to encrypt the message is used for decryption. When the private key is used for encryption it is typically called "signing". This means others can verify who the person is who 'signed' the message or verify who the person is who 'signed-off on a transaction because they can use the signers' public key to decrypt. If that doesn't work, the individual was not the one who sent the message. The entire message can be encrypted/signed, or, more commonly just the hash is encrypted/signed due to the inefficiency of private key encryption in the case of large messages. A hash is a unique string (e.g. base 64) or (HEX) number that uniquely represents the message. For simplicity, private key encryption in this document may refer to signing hashes as well as complete messages. When the public key is used for encryption it is called "encryption". In this case individual's private key (with hardware token) can be used to decrypt. Hashes can also be used to transform a unique string (like Social Security Number or other identification number) into another unique string without the ability to invert the process.

Therefore, only the individual who did the encryption can decrypt.

The following tables represent the identity authentication system roles and a typical computer-implemented use sequence.

TABLE 1

Individual 302 Role in identity process 300

| Control Function | Use Sequence |
|---|---|
| Initiate identity process 300 on the identity server 201, request device 314 with hardware keys 307 and software keys 315, 217 | 1 |
| Presents credentials (documents) 332 to identity editor 303 | 4 |
| During session with requestor 304 authorize release of identity editor public key 308 by identity server 201 for verification | 7 |
| Check time stamped verification transactions for the public identifier on identity server 201 | 11 |

TABLE 2

Identity Server 201 Role in identity process 300

| Control Function | Use Sequence |
|---|---|
| Provide 2FA hardware device 305 and username/password protected accounts to identity editor, individuals, and requestors, and manage its public keys | 2 |
| Pair individual 302 with a (registered) identity editor 303 | 3 |
| Serve identity editor public keys 308 (for decryption) for identity verification contract 351 | 8 |
| Perform logical verification 359 that the unencrypted public identifier and encrypted public identifier match and report result to requestor 304 | 9 |

TABLE 3

Identity Editor 303 Role in identity process 300

| Control Function | Use Sequence |
|---|---|
| Create invariant public identifier 310 and sign/encrypt the invariant of individual identity on identity server | 5 |
| Create new variant data (e.g. new address) 312 | 10 |
| Check time stamped verification transactions for the public identifier on identity server 201 | 11 |

TABLE 4

Requestor 304 Role

| Control Function | Use Sequence |
|---|---|
| Requests public identifier 310 to be verified | 6 |
| Check time stamped verification transactions for the public identifier on identity server 201 | 11 |

Figure 3:
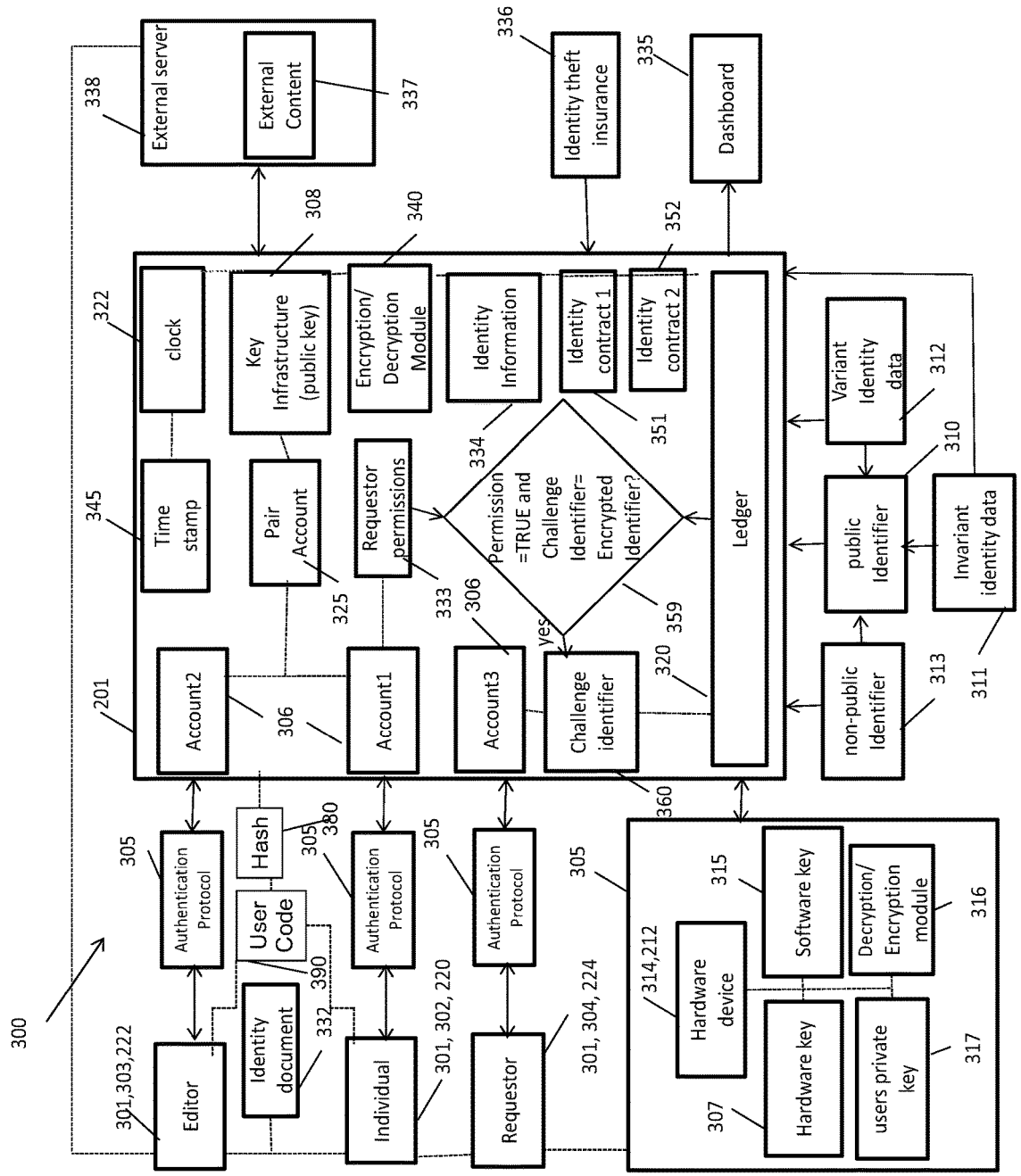
FIG. 3 is a block diagram of an exemplary embodiment of the cryptography, digital identity authentication, and security system or platform for use with FIGS. 1 and 2.

Referring now to FIG. 3, by way of example, and not limitation, there is illustrated a set of instructions for computer system 10, user 220, 222, 224 and/or server system 260 utilizing digital identity authentication platform 201 shown in block diagram 300. Preferably digital identity authentication block diagram 300 may be configured as algorithm, software or applications 206 operating and/or executing instructions or operations on computer system 10, user devices or user 220, 222, 224 and/or server, server system 260 (shown in FIGS. 1 and 2) where identity server/digital identity authentication platform 201, preferably as described above in FIGS. 1-2 may be utilized by user(s) 301, individual(s) 302, identity editor(s) 303, requestor(s) 304, or the like to enable requestor 304 to authenticate the identity of individual 302 and/or identity information 334, communicates data to server, server system 260, and such authentication of the identity is based on a validated and verified identity document 332 by identity editor 303.

Digital identity authentication platform 201 may further include encryption/decryption software, such as decryption/encryption module 316 and encryption/decryption module 340, to decrypt identity contract1 351 including public identifier 310, and/or to encrypt and decrypt identity information 334 exchanged between user(s) 301, individual(s) 302, identity editor 303, requestor(s) 304. The key infrastructure 308 evaluates and manages roles (301, 302, 303, 304), policies and procedures needed to create, manage, reference, distribute, use, store and revoke digital certificates (ownership keys) and manage the encryption process. The key infrastructure 308 can be part of an encryption at rest architecture—data stored in databases or servers is encrypted with public and private key (cloud services). In addition, decryption/encryption module 316 and encryption/decryption module 340 may encrypt/decrypt and watermark externally available content 337 such as content available on social media. The content 337 can be encrypted with the individual's private key 317 on hardware device 314 to digitally sign the content. The content 337 can be encrypted with the individual's public key in key infrastructure 308 to allow only the individual's private key to decrypt. The content, including source (e.g. author, time, and place)

information 337 can be signed with the server's private key to allow only the server's public key in key infrastructure 308 to decrypt the digital signature as a service to third parties such as news media.

The authentication protocol system 305 with encryption function(s) transfers the authentication data between users 301 and system 201. To secure this transfer of data encryption is used. This encryption uses encryption keys that are mathematically derived from authentication factors. Two-factor authentication requires something you know, such as a software key 315 (e.g. password) and something you have, such as hardware key 307. An example implementation of 2 factor security is called U2F (universal two factor) initially developed by GOOGLE and YUBICO, with contribution from NXP Semiconductors, and now hosted by the FIDO Alliance. Hardware device 314 capable of generating an authentication hardware key 307, may alternatively be a security token, smart card, DIAD/Powerpad, or biometric data or device, such as FITBIT or other hardware data or device capable of uniquely identifying the unique heartbeat or heartbeat pattern, fingerprint, face, iris, or other unique identifier or characteristic of somebody (individual 302, identity editor 303, and requestor 304) and such unique identifier may be used as a two-factor authentication herein.

The authentication protocol system 305 may include a first factor, such as software key 315 (e.g. a user name and password, pin, soft token), and a second factor may utilize hardware key 307 to identify parties to accounts, identity server accounts on digital identity authentication platform 201, such as Account(s) 306. Hardware keys 307 may be synchronized to the users 301 public key in key infrastructure 308 with an event counter, such as system clock 322. Hardware key 307 may use specialized hardware device 314 capable of generating an encryption key depending on the hardware elements (e.g. security tokens, smart cards, motherboard serial numbers or numbers in ROM). The encryption key, such as private key 317 may be used to sign messages communicated thereto user device 220, 222, 224 via USB (universal serial bus) or NFC (near field communication) devices, or Bluetooth communication or via input/output (I/O) controller 108 or hardwired thereto bus 110 of user device 220, 222, 224 to provide two-factor authentication across a variety of services.

Moreover, authentication protocol system 305 may enable individual 302, identity editor 303, and requestor 304 (parties) to offer a strong cryptographic 2nd factor option for end user security. The parties' dependence on passwords is reduced. The password can even be simplified to a 4 digit PIN. End users carry a single U2F device (hardware device 314) which works with any relying party supporting the protocol and user device 220, 222, 224. The user gets the convenience of a single 'key fob' or smart card device and convenient security.

Note, in our preferred implementation of authentication protocol system 305 hardware key 307 never leaves physical hardware device 314. An example of this type of an implementation is the Unified Two Factor standard. It will also never appear or be stored in the memory of a computer, user device 220, RAM 104, server 260, database 270 of digital identity authentication platform 201 even for an instant. This provides mobility, since each user carries their hardware device 314 with security token 307 with them rather than having it tied to a single computer. So even in the case of an "inside job" nobody can breach the identity of individual(s) 302 or author new identity contracts without user's hardware device 314 with hardware key 307.

It is contemplated herein that an identity service may assign hardware keys 307 to all roles, whereby a role is a function assumed by a person or a thing in a particular situation. The roles are: user(s) 301, individual(s)(who want to be authenticated) 302, identity editor (who perform the validation, verification & authentication) 303, requestor(s) (who want the result of the authentication) 304, whereby users 301 would generate and store private keys 317 based on hardware key 307 and individualized software keys 315 on their device 314 and whereby digital identity authentication platform 201 holds or stores all public keys (of the private/public pair) in key infrastructure 308 for decryption to verify the individual users identity and identity information 334. The authentication protocol system 305 and digital identity authentication platform 201 can also prevent phishing and cloning thereof.

Furthermore, digital identity authentication platform 201 may include third factor authentication. Third-factor authentication includes identity editor 303 authenticating the identity of individual 302 and validating and verifying identity document 332 of individual 302. Moreover, digital identity authentication platform 201 may further include an option to authenticate the identity of individual 302 to another server, such as external server 338 and to automatically provide credentials to securely connect to external server 338 and to submit external content 337.

It is further contemplated herein that in addition to the specific (asymmetric) encryption described herein, other known or discovered encryption/decryption schemes for securing data as well as single and multi-factor authentication systems and methods of securing the user's identity during an authentication flow are incorporated herein. Examples of known encryption methods are DES, RSA, Blowfish, Twofish, AES, Diffie-Hellman, ElGamal, ECC, in addition to Honey Encryption and Quantum Key encryption in the near future. The consistent distribution and security of ledger 320 of identity contracts 351/352 can be further increased by distributing this database through block chain technology.

Figure 4:
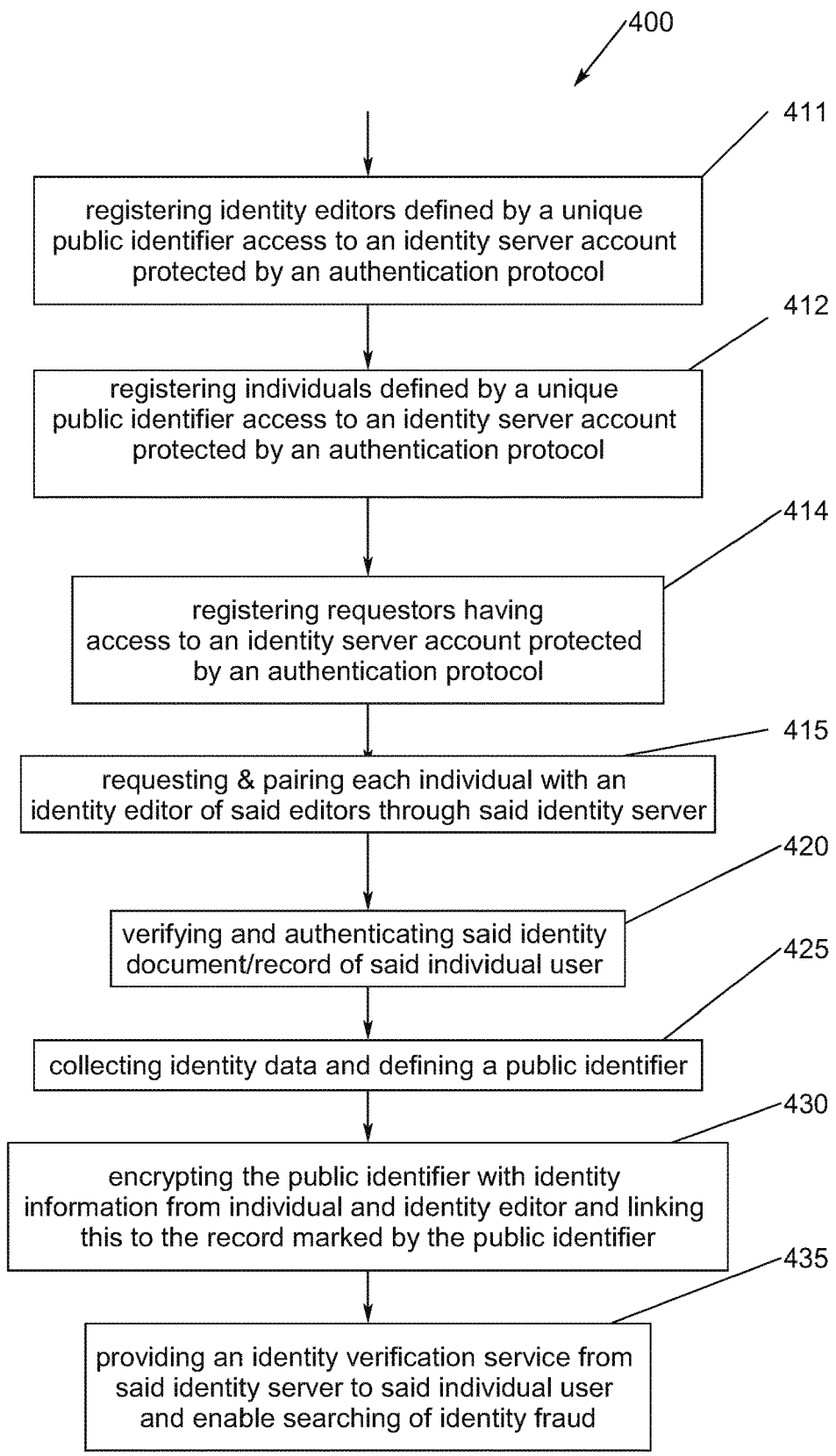
FIG. 4 is an exemplary embodiment of a flow diagram or chart of the cryptography digital identity authentication, and security steps performed by individual, identity editor, and requestor thereon digital identity authentication system or platform of FIG. 3.
Figure 5:
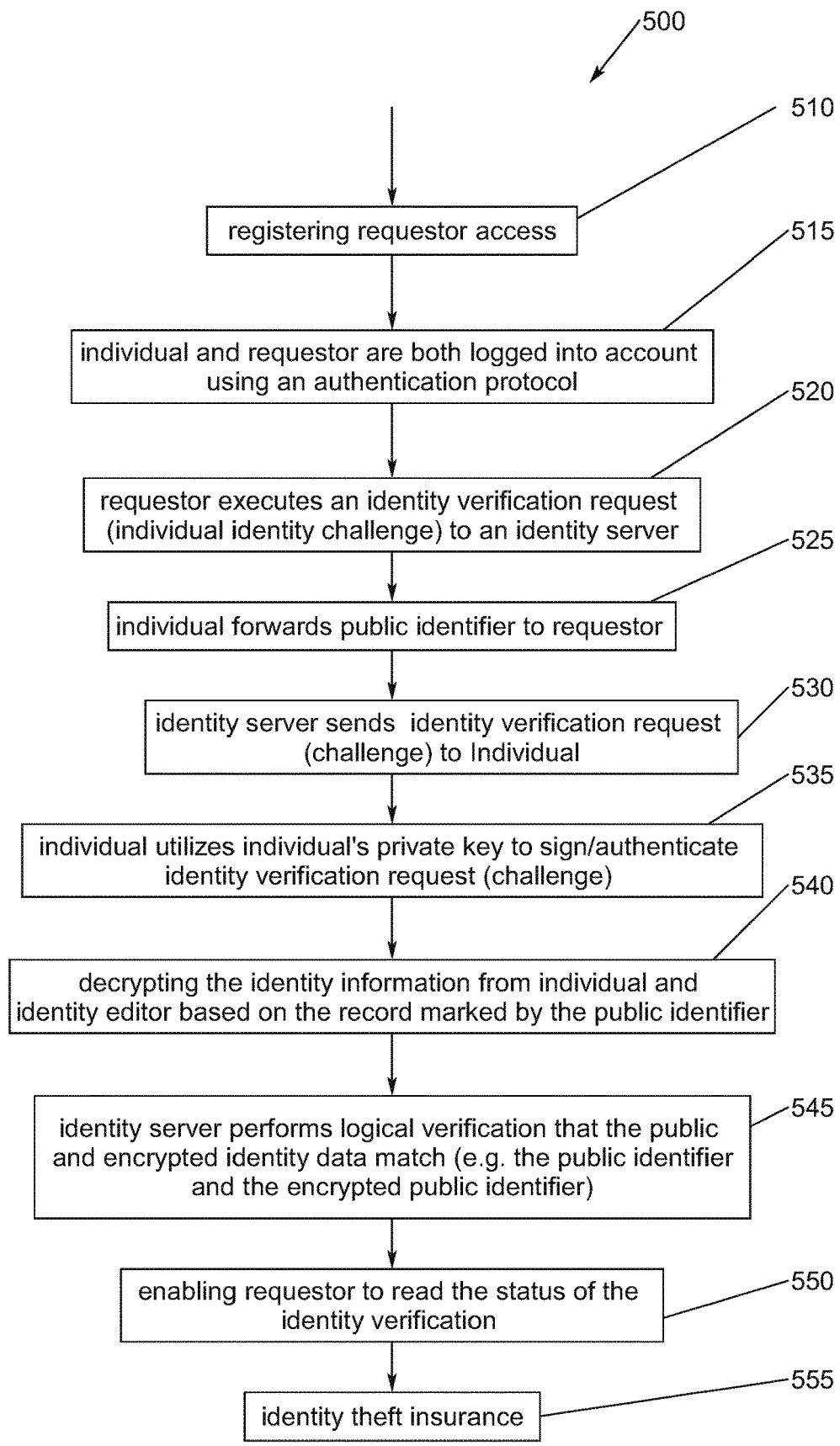
FIG. 5 is an exemplary embodiment of a flow diagram or chart of the digital identity authentication steps performed by individual, identity editor, and requestor thereon digital identity authentication system or platform of FIG. 3.

Referring now to FIGS. 3 and 4, by way of example, and not limitation, there is illustrated in FIG. 4 a flow diagram of an exemplary embodiment of digital identity authentication platform 201 model, scenario and dashboard results. Digital identity authentication platform 201 may be utilized to register or self-registration of user(s) 301 to create one or more identity server accounts (first, second, and third identity server accounts), such as account 306 therein digital identity authentication platform 201. Preferably, identity algorithm, software or applications 206 may include steps 400. In step 411, digital identity authentication platform 201 registers (registering) identity editor 303 utilizing a smart device, such as user device 222 and authentication protocol system 305 with editor's hardware keys 307, on hardware device 314 to identity and link identity editor 303 to editor account (Account2) 306 thereon digital identity authentication platform 201, where each identity editor 303 registration may be defined by one or more unique public identifiers 310, such as invariant data 311 and variant data 312. Invariant data 311 may include one or more of each of identity editor's 303 birth name, country code, National Identification Number (e.g. Social Security number), date of birth, place of birth, assigned number or the like. Variant data 312 may include one or more of each of identity editor's 303 address, phone number, driver's license number, employer EIN, employment role, credit card numbers, server passwords, insurance card numbers, passport number, or other like government issued ID, lists of identity verification questions and answers, place of birth, maiden names, user IDs, passwords, commission & notary stamp, omissions and error insurance or other unique data string or the like with a timestamp 345 generated by system clock 322 for the date(s) or period variant is in use (timestamp), i.e., when user utilized the variant.

It is contemplated herein that information or data on digital identity authentication platform 201 may include public identifier (on identity server 260), timestamp 345 (on identity server 260), identity data (on identity server 260), and external content (external server 338).

It is further contemplated herein that individual's 302 public identifiers 310 may be entered by identity editor 303, by applying a fixed deterministic formula for people in a class (e.g. USA citizens with Social Security Numbers). Alternatively identifier can therefore be automatically constructed for each individual(s) 302 on the basis of this deterministic formula. There should only be one possible public identifier per individual(s) 302 (e.g. Example USA-SSN: 4446784567). This enables people outside digital identity authentication platform 201 to check for false registration.

In addition a unique identifier (such as Employer Identification Number) can be added to the public identifier 310 for the individual. This allows the employer as identity editor 303 to define specific roles in the context of employment (such as receiving packages, filing taxes, or authorize individual to execute specific transaction on behalf of the business) in the identity contract 352 that are different from the roles of a private individual 302. The public identifier 310 can be hashed to further protect privacy. Moreover, a rating (e.g. AA or like qualifiers) to the identifier 310 to mark the quality of the identity editor 303 review of the correctness of the public identifier 310, invariant data 311 and 312. This rating can later be used to automatically act on attempts of duplicate identifier 310 registrations by maintaining the higher quality rated public identifier 310, invariant data 311 and 312.

Identity editor 303 may access and authenticate their access to editor account (Account2) 306 thereon digital identity authentication platform 201 utilizing software key 315 and editor's hardware key 307, such as hardware device 314.

In step 412, digital identity authentication platform 201 registers (registering) individual 302 utilizing a smart device, such as user device 222 and authentication protocol system 305 with individual physical hardware keys 307, on hardware device 314 to identity and link individual 302 to individual account (Account1—individual user account) 306 thereon digital identity authentication platform 201, where each individual 302 registration may be defined by one or more unique public identifiers 310, such as invariant data 311 and variant data 312. Invariant data 311 may include one or more of each of individual 302 birth name, National Identification Number (e.g. Social Security number or the like), date of birth, place of birth, or the like. Variant data 312 may include one or more of each of individual 302 address, phone number, driver's license number, employer EIN, employment role, credit card strings, server passwords, insurance card numbers, passport number, or other like government issued ID, lists of identity verification questions and answers, place of birth, maiden names, user IDs, server passwords, or other unique data string or the like with a timestamp 345 generated by system clock 322 for the date(s) or period variant is in use (timestamp), i.e., when user utilized the variant.

Individual 302 may access and authenticate their access to individual account (Account1) 306 thereon digital identity authentication platform 201 utilizing software key 315 and individual's hardware key 307, such as hardware device 314.

It is contemplated herein that individual account (Account1) 306 may also cover a minor or child or trust. Moreover, individual account (Account1) 306 may cover a group of people allowing individuals (e.g. parents, guardians, executor, or the like) (agents) to release identity editor's public key in key infrastructure 308 for another member of the group (child, aging parent, disabled person, trust, or the like (dependents), as individual 302). Alternatively, dependents public identifier 310 used during verification may be a non-public identifier 313 (or hidden) of the agent's public identifier 310 using the dependents public identifier 310 (e.g. SSN). Dependents likely would not have their own identity contracts 351. The guardian may provide the child's non-public identifier 313 (which would normally be their SSN) to the requestor 304. The identity system 201 would block registration of non-public identifiers 313 that match public identifiers 310, such that no identity contracts 351 can be opened for dependents.

In step 414, digital identity authentication platform 201 registers (registering) requestor 304 utilizing a smart device, such as user device 222 and authentication protocol system 305 with individual physical hardware keys 307, on hardware device 314 to identity and link requestor 304 to requestor account (Account3) 306 thereon digital identity authentication platform 201, where each requestor 304 registration may be defined by one or more unique public identifiers 310, such as invariant data 311 and variant data 312. Invariant data 311 may include one or more of each of individual 302 birth name, Social Security number (SSN), date of birth, place of birth, or the like. Variant data 312 may include one or more of each of individual 302 address, phone number, driver's license number, passport number, or other like government issued ID, corporate role, lists of identity verification questions and answers, place of birth, maiden names, user IDs, passwords, or other unique data string or the like with a timestamp 345 generated by system clock 322 for the date(s) or period variant is in use (timestamp), i.e., when user utilized the variant.

Requestor 304 may access and authenticate their access to requestor account (Account3) 306 thereon digital identity authentication platform 201 utilizing software key 315 and requestor's hardware key 307, such as hardware device 314.

In step 415, individual 302 may request (requesting) an identity editor 303 and digital identity authentication platform 201 may assign or pair (pairing) a selected identity editor 303 identity editor account (Account2) 306 thereto individual 302 individual account (Account1) 306 to create a paired user or pair account 325 (between individual 302 and selected identity editor 303). It is contemplated herein that paired account 325 may have its own identity editor 303 private/public key pair different from the identity editor 303 personal private key used to authenticate the editor to his account in digital identity authentication platform 201. It is contemplated herein that digital identity authentication platform 201 may pair individual 302 with selected identity editor 303, such as identity editor 303 geographically close in proximity thereto individual 302.

Moreover, ledger 320 may be updated therein digital identity authentication platform 201 with individual 302 paired to identity editor 303. Furthermore, dashboard 335 may be updated therein digital identity authentication platform 201 with individual 302 and identity editor 303. It is contemplated herein that dashboard 335 may display or record the identity contracts and transactions with a timestamp, including the public identifier 310 and timestamp 345.

In step 420, verifying (verifies) and authenticating (authenticates) the identity of individual 302 and/or identity document 332 of individual 302 by identity editor 303, based on: legal practice establishing proof of identity via in-person or remote video comparison to identity documents 332 and the verification and validation of identity documents 332 such as driver's license, passport, birth certificate, social security number, or other like government issued documents presented by individual 302 to identity editor 303 for identity editor 303 to visually verify, identify, and authenticate individual 302 or by examining a biometric characteristic of individual 302 and confirmation of variant data 312 (e.g. an address verification—a copy of a telephone, cable or utility bill that also contains the name and address of individual 302), collectively the identity document 332.

It is contemplated herein that digital identity authentication platform 201 may verify and authenticate the identity of individual 302 by examining a biometric characteristics (e.g. weight, height, heart rate rhythm, brain wave, iris pattern, fingerprint, facial or other image recognition) of individual 302 and comparing such to a prior authenticated biometric characteristics on existing hardware devices 314 such as smartphones. It is further contemplated herein that digital identity authentication platform 201 may remotely verify and authenticate the identity of individual 302 by evaluating individual 302 asset control via visual control (e.g. facetime) over assets known to be in his possession (e.g. access to house by home owner) and asset can be validated (e.g. google street maps, GPS tracking, possession of phone and ability to read a text code or the like), collectively the identity document 332. It is further contemplated herein, that the identity editor 303 may be an automated service using an expert system or artificial intelligence to authenticate individual 302 remotely.

Moreover, individual 302 or identity editor 303 may define, amend, add to, fill in individual 302 profile information such as contained in identity document 332, invariant data 311 and variant data 312 therein digital identity authentication platform 201 and identity editor 303 shall verify, authenticate, correct, and validate individual 302 identity information 334 of individual 302. It is contemplated herein that variant data 332 contained in identity information 334 would include proof of employment, employer identification (e.g. EIN), employee role, credit card numbers, insurance card numbers and other data that needs to be transmitted. It is contemplated herein that identity editor 303 may be a notary, employer, mail person, UPS, FEDEX, bank employee or other in documented witness. It is contemplated herein that identity editor 303 may visit the location of the individual's 302 residence or other address as a (delivery man). It is also contemplated that identity editor 303 is a remote person (e.g. online notary or other identity editor or identity editor system) or automated service based on an expert system or artificial intelligence.

In step 425, digital identity authentication platform 201 collects (collecting) and stores verified identity information 334 based on (individual's invariant 311 and/or individual's variant 312) identity data (such as social security number) and based on identity data (identity editor's invariant 311 and/or identity editor's variant 312), such as identity editor's name and commission. Moreover, digital identity authentication protocol system 305 may assign, store (storing) and manage individual 302, identity editor 303, and requestor 304 each unique public key in key infrastructure 308. Identity editor 303 preferably creates or defines a unique public identifier 310 of individual 302 utilizing or from the individual 302 invariant data 311. Moreover, digital identity authentication platform 201 may make or generate individual 302 public identifier 310 based on invariant data 311 available on digital identity authentication platform 201 as a ledger 320 record and publish this on dashboard 335.

In step 430, digital identity authentication platform 201 provides the step of aggregating public identifier 310 of individual 302 together with identity information 334 of the individual 302 and identity information 334 by identity editor 303 (aggregate) and signing/encrypting via encryption module 340 this aggregated data with the identity editor 303 private key 317, generated from the identity editor 303 hardware key 307 and the identity editor's 303 software key 315. The combination of the signed/encrypted public identifier 310 of individual 302 and identity information 334 from individual 302, forms the encrypted identity contract1 351 which is linked to public identifier 310 of individual 302.

Optionally one or several non-public identifiers 313 may be used to link to public identifier 310. Optionally, in step 430, digital identity authentication platform 201 provides the additional step of identity editor 303 encrypting identity contract 351 for the pair account 325 with the individual's public key in key infrastructure 308 available through pair account 325 prior to aggregating public identifier 310 of individual 302 together with identity information 334 of the individual 302. In this case in step 540, the identity contract 351 cannot be decrypted in the platform 201 without decryption by the individual private key 317. Thus, the "secret" contract data 334 in identity contract 351 is only revealed at decryption time in a runtime container during decryption at runtime 540 and thus can be much better protected from unauthorized access of identity platform 201.

Optionally, in step 430, digital identity authentication platform 201 provides the step of identity editor 303 encrypting identity information 334 with the individual's public key in key infrastructure 308 available through pair account 325 prior to aggregating public identifier 310 of individual 302 together with identity information 334 of the individual 302 and identity information 334 by identity editor 303 and signing/encrypting this aggregated data with the identity editor 303 private key 317, generated from the identity editor 303 hardware key 307 and the identity editor's 303 software key 315. The combination of the signed/encrypted public identifier 310 of individual and identity information 334 from individual 302, forms the encrypted identity contract1 351 which is linked to public identifier 310 of individual 302. In this case, individual 302 private key 317 needs to be present to decrypt identity information 334 to requestor 304 at the time of the verification of identity information 334. For example, such a situation can occur when the individual role 302 and the requestor role 304 are the same person, and the individual wants to retrieve "secret" information.

It is contemplated herein that actions under digital identity authentication platform 201 may include sign (encrypt with private key), encrypt (encrypt with a public key), identify a challenge (who am I dealing with), source challenge (who created content), and decrypt (to reveal content).

It is further contemplated herein that actions under digital identity authentication platform 201 may include: individual 302 may transmit, or make available through other means, public identifier 310 to requestor 304, and requestor 304 may enter the data of public identifier 310 into the identity authentication platform 201 so identity authentication platform 201 can locate the account of individual 302; and individual 302 may permit release of identity editor's 303 public key in key infrastructure 308 in paired account 325, and digital identity authentication platform 201 decrypts public identifier 310 and identity information 334 and timestamp 345 of individual 302 with identity editor 303 public key in key infrastructure 308 to reveal identity information 334 to requestor 304.

It is further contemplated herein that actions under digital identity authentication platform 201 may include: individual 302 has previously made, public identifier 310 available to requestor 304, so identity authentication platform 201 can locate the account of individual 302. In this case, requestor 304 may be allowed to initiate the specific transactions tied to his role that match transactions tied to the role of the individual 302.

Moreover, ledger 320 may be updated therein digital identity authentication platform 201 with identity contract 351. Furthermore, dashboard 335 may be updated therein digital identity authentication platform 201 with public identifier 310 and identity contract 351 and its timestamp 345. It is contemplated herein that dashboard 335 publicly displays public identifier 310 with timestamp 345 and optionally transaction type or type of event.

Moreover, in step 430, digital identity authentication platform 201 may subsequently perform the step of or enables identity editor 303 therein digital identity authentication platform 201 utilizing individual's invariant data 311 and paired identity editor's private key 317 to sign/encrypt (encrypting) individual's data record (documents, digital signature, identity) identity information 334 including individual's updated variant data 312 as Identity Contract2 352 having timestamp 345 and stores (storing) or linking updated encrypted identity information 334 to public identifier 310 as identity contract2 352 with identity editor's public key in key infrastructure 308 in pair account 325.

Furthermore, dashboard 335 may be updated therein digital identity authentication platform 201 with identity contract2 352 linked to individual 302 public identifier 310.

In step 435, digital identity authentication platform 201 performs the step of providing an identity verification service between digital identity authentication platform 201 and individual 302 linked thereto identity editor 303. Moreover, digital identity authentication platform 201 may enable individual 302 to perform a search (searching) individual's public identifier 310 on dashboard 335 to identify fraudulent registration of individual 302 and to track a time-stamped definition and use of identity contract1 351 or subsequent identity contract2 352 by requestors 304. This means that fraud will most often be limited to a single transaction for individual 302 by compromising identity editor's 303 functions. However, such compromised transactions can be flagged and then can be promptly investigated and remedied.

It is contemplated herein that identity contract1 351 may be made available utilizing authentication protocol system 305 of requestor 304 and individual 302 and identity editor's public key in key infrastructure 308 as well as a logical executable 359 that compares the decrypted public identifier 310 in identity contract1 351 to public identifier 310 provided by the individual 302 to requestor 304.

It is contemplated herein that digital identity authentication platform 201 provides 3 factor identity authentications for individual 302. The first factor preferably may be software key 315, something that the individual knows. The second factor may be based on hardware key(s) 307, which may use specialized hardware device 314 with ROM 106, capable of generating private key 317 which may be in possession of individual 302. The third factor may be based on who individual 302 physically is, and this is satisfied through identity editor 303 by proxy, who verifies the identity of individual 302 and signs/encrypts individual's 302 identity contract1 351 containing individual's 302 identity information 334 with identity editor 303 software key 315 and identity editor's 303 hardware (keys) 307. This identity contract1 351 can then be used by individual 302 to make trusted information available to others.

Referring again to FIG. 5, by way of example, and not limitation, there is illustrated a flow diagram of an exemplary embodiment of digital identity authentication platform 201 decrypting individual 302 identity. Preferably, identity algorithm, software or applications 206 may include steps 500 wherein digital identity authentication platform 201 provides an identity authentication service between individual 302 and requestor 304. In step 510, digital identity authentication platform 201 registers requestor (registering) 304 as set forth in step 414 above. Requestor 304 may solicit an identity challenge therefrom individual 302 via digital identity authentication platform 201.

In step 515, individual 302 and requestor 304 are preferably both logged into account1/account3 306 utilizing an authentication protocol system 305. In step 520, requestor 304 requests verification of individual's 302 identity(ies) by executing or issuing an identity verification request (challenge) 360 to digital identity authentication platform 201. Moreover, digital identity authentication platform 201 may evaluate the role(s) of requestor 304 and individual 302.

Moreover, ledger 320 may update therein digital identity authentication platform 201 with requestor 304 having requested the identity of individual 302. Furthermore, dashboard 335 may update therein digital identity authentication platform 201 with individual 302, identity editor 303, and requestor 304.

In step 525, individual 302, who agrees or wants to disclose their identity, forwards individual's public identifier 310 (e.g., specific type) to requestor 304. Requestor 304 preferably provides individual's 302 public identifier 310 to digital identity authentication platform 201. Moreover, digital identity authentication platform 201 locates individual's public identifier 310 and identity verification request (challenge) 360. It is contemplated herein that individual 302 may disclose public identifier 310 linked to the public identifier, as a non-public hidden identifier to requestor 304. It is also contemplated herein that the individual public identifier 310 is already known to the requestor 304 from a prior transaction eliminating the need for step 525.

In step 530, digital identity authentication platform 201 sends an identity verification request (challenge) 360 to individual 302. In step 535, individual 302 utilizes individual's private key 317 to sign/authenticate identity verification request (challenge) 360 which may set requestor 304 permission 333 to TRUE. Alternatively, individual 302 may grant permission to a requestor 304 or group of requestors 304 under certain conditions (such as for a limited time period). By setting requestor's 304 permission 333 to TRUE, individual 302 confirms or agrees to releases (releasing) of public key in key infrastructure 308 of paired individual 302 identity editor 303 (paired account 325) (individual 302 approves identity transaction) by digital identity authentication platform 201 to be used for verification of identity of individual 302.

It is contemplated herein that individual 302 first has to provide requestor 304 their public identifier 310 before the process can kick off. This can be done on the phone or through the system 201. Alternatively, requestor 304 has to provide their public identifier 310 to enable individual 302 to forward theirs. Otherwise the two cannot find each other in digital identity authentication platform 201.

In step 540, digital identity authentication platform 201 locates (locating) public key in key infrastructure 308 of paired individual 302-identity editor 303 (paired account 325) by using individual's 302 public identifier 310 and digital identity authentication platform 201 may push public key in key infrastructure 308 of paired individual 302-identity editor 303 from pair account 325 to encryption/decryption module 340. Moreover, digital identity authentication platform 201 may utilize public key in key infrastructure 308 of paired individual 302 identity editor 303 (paired account 325) and requestor 304 obtained individual's 302 public identifier 310 to decrypt identity contract1 351 containing individual 302, public identifier 310 as well as invariant data 311 and variant data 312 stored in identity information 334. Alternatively in step 540, for key infrastructure 308 based on the encryption at rest architecture, the identity contract 351 may be pushed into the encrypted key management system 308 and decrypted therein.

Optionally in the case of step 430, digital identity authentication platform 201 provides the additional step of identity editor 303 encrypting identity contract 351 for pair account 325 with the individual's public key in key infrastructure 308 available through pair account 325 prior to aggregating public identifier 310 of individual 302 together with identity information 334 of individual 302, then during the decryption by the individual 302 private key, the identity editor 303 public key 308 for the pair account 325 is also decrypted and can be used to verify the identity editor 303 signature without access to a key infrastructure 308. To verify that identity contract 351 does not get modified on individual device 314 (e.g. to modify roles) the decrypted identity contract 351 is re-encrypted again with individual public key 308 and compared to the original encrypted identity contract 351.

Moreover, individual 302 may now allow the use of the identity editor 303 public key in key infrastructure 308 inside the identity authentication platform 201 for the purpose of decrypting identity contract, such as identity contract1 351 provided by identity editor 303.

Moreover, ledger 320 may be update therein digital identity authentication platform 201 with request for identity contract1 351. Furthermore, dashboard 335 may be update therein digital identity authentication platform 201 with individual 302, identity editor 303, and requestor 304.

In step 545, digital identity authentication platform 201 performs the step of verifying individual's 302 public identifier 310 in identity verification request from requestor 304 (challenge) 360 is identical to decrypted public identifier 310 in the identity contract1 351. Moreover, digital identity authentication platform 201 executes or activates logical identity verification 359 by comparing individual's 302 public identifier 310 (unencrypted) in identity verification request (challenge) 360 to decrypted individual's public identifier 310. If individual's public identifier 310 (unencrypted) is identical (match) to decrypted individual's 302 public identifier 310 in identify contract1 351 then the rest of the encrypted individual's variant data 312 and individual's invariant data 311 in identity information 334 is correct as well.

It is further contemplated herein that in addition to the specific scheme of executing the logical identity verification 359, there are other known or discovered schemes for logical verification that individual 302 has paired account 325, for instance at the time of the creation of the identity contract 351 or 352 a flag is set in paired account 325 that identity contract is authenticated. In this case the logical identity verification 359 would include a check of requestor permission 333 is true and a check if the flag in the paired account 325 is set to true.

In step 550, digital identity authentication platform 201 performs the step of enabling requestor 304 to read the status of the identity verification (whether true/false—individual's 302 public identifier 310 (unencrypted) is identical (match) to decrypted individual's public identifier 310, and, the requestor permission 333 is set to TRUE). Moreover, digital identity authentication platform 201 communicates status of the identity verification (whether true/false/matches) thereto requestor 304 while requestor 304 is logged into digital identity authentication platform 201. It is contemplated herein that digital identity authentication platform 201 may enable requestor 304 to read the status whether public identifier 310 of individual 302 in identity verification request matches decrypted public identifier 310 in identity contract 351/352. Once the verification 359 is true (match), all the identity information 334 can be assumed to be true as well. Moreover, digital identity authentication platform 201 may function to provide identification and authentication of individual 302 thereto requestor 304 or provide specific type of identity information or a credential or external content 337 on external server 338 or dashboard 335 is verified.

Digital identity authentication platform 201 may function to provide identification and authentication of individual 302 independent of the secrecy of the individual's invariant data 311 and variant data 312.

Digital identity authentication platform 201 may be utilized in a number of applications to identify and authenticate individuals or entities. For example, and clearly not limited thereto, to identify and authenticate profiles on social media sites. It is estimated that approximately half of the online profiles are fake. An individual 302 may set up his or her profile on social media sites and then authenticate the profile information or data via digital identity authentication platform 201 wherein individual's variant data 312 (such as true pictures, weight, height, hair color, employment, income, school attendance, home ownership, residence, and other like variant information) or updated individual's variant data 312 may be verified by identity editor 303 as part of an online profile linked to a identifier used by the online site. Individual 302 may be identified as unauthenticated until individual's variant data 312 is authenticated via digital identity authentication platform 201. Decryption of authenticated profile data can be allowed for all requestors 304 that are part of the same dating site service under specified conditions. Regarding matchmaking or online dating sites or other lowered identification and verification requirement uses of digital identity authentication platform 201 a simplified flow as set forth in FIGS. 3, 4, and 5 may be utilized without hardware device 314 but with software key 315. Individual's 302 variant data 312 and invariant data 311, such as date of birth, dated current photo, proof of employment, financial accounts, utility statements, may be sufficient authentication for identity editor 303 who signs/encrypts the requested type or selection of identity information 334 linked to public identifier 310 for individual 302 used by an online site.

When individual 302 needs to identify themselves to a third party (requestor 304) they provide individual's public identifier 310 as well as agree to use of public key in key infrastructure 308 of paired individual 302-identity editor 303. This allows or enables digital identity authentication platform 201 and its application to verify individual 302 identity utilizing logic executable 359 therein digital identity authentication platform 201. This approach can be applied to person-to-person interactions and person-to-automated service interactions.

Furthermore, in certain applications it may be useful to have non-public identifiers 313. Non-public identifiers 313 may be unique random strings linked to public identifier 310. Such non-public identifier 313 may be transmitted wirelessly to a device that connects to digital identity authentication platform 201. This means that requestor 304 would not know who he is verifying (individual 302), requestor 304 would only know the result of digital identity authentication platform 201 verification (yes/no) and a picture of (individual 302) who could be standing in front of requestor 304. For instance, are you older than 21 to go into a bar? The individual 302 cannot use somebody else's public identifier, because individual 302 who is connected to digital identity authentication platform 201 would be able to find the correct individual's public key in key infrastructure 308 to decrypt the identity contract 351 and access identity information 334. Individual 302 cannot use somebody else's two factor authorization device, hardware device 314, because the pictures of individual 302 would not match up. This whole process could again be automated whereby individual 302 stands in front of a camera with facial recognition, whereby the facial variant parametric identity, non-public identifier 313 is linked to the public identifier 310. This implementation of digital identity authentication platform 201 enables privacy and security.

Furthermore, in certain applications, it may be useful to establish a line of communication (chat) between the requestor 304 and the individual 302. In the case of reception of packages, the receiver (individual 302) of the package is identified by his/her public identifier 310 or non-public identifier 313 as well as the delivery address. This allows the delivery person (requestor 304) to contact individual 302 prior to delivery to sign for both the receipt of the delivery and any delivery instructions for said delivery. This entire process can be done without the receiver and delivery person meeting face to face. As such digital identity authentication platform 201 can perform the role of a spam less, secure telecommunications system. Furthermore, in certain applications it may be useful to combine the digital identity authentication platform 201 with another server implementation, such as external server 338. For instance, certain individuals 302, who are employed by a company, can have the right to file tax or payroll returns on behalf of the company on an IRS server, such as external server 338. In this scenario, the digital identity authentication platform 201 may further include an option to authenticate the identity of individual 302 to another server, such as external server 338 and to automatically provide credentials to securely connect to external server 338 and to submit external content 337 such as a tax or payroll return. This will also protect the organization from password sharing or stealing between individual employees. It would also allow existing systems to operate more security with existing username password protection, because such as system could regularly update these external server 338 passwords automatically through a secure password generator. Alternatively, the external server 338 password can be encrypted in the identity contract 351. Such password would be harder to change, but much easier to protect.

Other requestor 304 scenarios may include, but are not limited to, where requestor 304 is a remote person, close person, remote server, or close wireless server. These may all be important use cases dealing with access to venues and access to online accounts.

In step 555, digital identity authentication platform 201 may perform the step of providing identity theft insurance 370 thereto individual 302 and/or requestor 304 for false positive identification. It may be an important aspect since it actually would cover the financial losses in the narrow case of a false positive identification. Having the financial losses covered is far more valuable than to provide insurance to restore identity (as is currently offered). Digital identity authentication platform 201 is configured to easily and quickly issue new identity contract2 352 as set forth in step 430 for individual 302 if identity contract1 351 becomes compromised.

Description of technical fraud scenarios problems and their mitigation via digital identity authentication platform 201:

1) Systemic fraud e.g. hacking secure authentication protocol system 305, browser, and identity server software—a) Phishing/cloning attempts thereon digital identity authentication platform 201 are mitigated utilizing the U2F standard for two-factor authentication protocol (2FA) 305. b) software keys, such as public key in key infrastructure 308 stolen from identity server, digital identity authentication platform 201 are mitigated utilizing the U2F standard for two-factor authentication protocol system (2FA) 305 since the U2F standard does not make public the private key 317, so no new identity contracts can be made for existing individual 302 who has a unique public identifier 310. Moreover, the identity information 334 and identity editor 303 pairing is also secret. Editor 303 public keys can also be encrypted using the user 302 public key. All public keys can be stored in an encryption at rest system so they are never revealed. c) ransomware—Digital identity authentication platform 201 may utilize redundant secure servers 260 to segment access thereto individuals 302 and requestor 304. If one server 260 gets locked by ransom ware or is hijacked, it won't affect all identity contracts 351. One server 260 may be taken off-line until breach is identified and patched. Redundant and backup server 260 may be utilized. Alternatively, a serverless environment can be deployed whereby all deployed software and documents are deleted immediately after execution; and/or d) other direct server hacker attack (such as denial of service)—digital identity authentication platform 201 utilizes limited complexity and information volume of identity contract1 351 and allows more effective monitoring and security of identity contract1 351. Digital identity authentication platform 201 may also be replicated in a container and deployed as an identity license server to a third party service (e.g. social media company) behind its firewall. These containers could be regularly updated to reflect the latest identity information.

2) Registering of fake identity editor 303—Mitigation either by in-person verification of identity editor 303 commission and address or activate identity editor 303 registration by mailing a passphrase to mailing address as stated in commission (bankcard approach). Maintain separate off-line internal database 270 of identity editors 303 that is not externally accessible to verify active in-system identity editors 303 at regular or current time. One day wait time for activation of new identity editor 303 registrations, so there is time for off line verification. Once digital identity authentication platform 201 identifies a corrupt identity editor 303 then all prior identity editor 303 authentications of individual 302 and identity contracts 351/352 may be cancelled and invalidated.

3) Registering of fake non-prior registered individual 302 or identity contract1 351 valid identity editors 303 committing fraud—Mitigation—a) public (individuals 302) can actively search to see if their unique public identifier 310 is registered or in unauthorized use on dashboard 335 and thus this fraudulent identity request can prompt an investigation therein digital identity authentication platform 201. Public identifier 310 can also have a rating based on the type of editor (e.g. AA) verification and validation that has taken place. This would allow lower rated identifiers 310 accounts to be frozen before higher rated ones. b) identity editors 303 cannot target specific identities to forge since individuals 302 and identity editors 303 are paired by digital identity authentication platform 201. Losses may incur, but fraudulent identity editors 303 can be identified by digital identity authentication platform 201 and held legally liable. Moreover, losses are limited because identity editors 303 new registrations can be capped per day and monitored by system administration of digital identity authentication platform 201.

4) Add new identity contract by hijacked existing bona fide identity editors 303 account—a) For prior registered identity individual 302—Mitigated by identifying previous identity contract1 351 execution, and digital identity authentication platform 201 may identify and flag new identity contract2 352 info having significantly different individual's invariant data 311, such as a photograph, height etc. Such implausible variations over time can be identified using machine learning algorithms. Moreover, individual 302 of original identity contract1 351 may be notified via user device 220 and dashboard 335 of the issuance of a new identity contract to flag possible identity theft. b) For all individuals 302—Mitigated by digital identity authentication platform's 201 access requirement of individual 302 needs both editor 303 user software key 315 as well as identity editor 303 hardware device 314 with hardware key 307. Likewise, digital identity authentication platform 201 may similarly identify whether identity editor's 303 software keys 315 or hardware keys 307 are stolen or in misuse.

5) Incorrect author of external content 337—Mitigated by digital identity authentication platform's 201 arranging secure authentication of personal data or the ability to watermark users data (marked with a digital signature including individual's name, and/or individual's invariant data 311 of the verified user who uploaded the content. Moreover, information, content, personal data or watermark user's data (identity information 334) can only be encrypted (and made private) by the individual's public key in key infrastructure 308 and decrypted by a verified and logged in individual 302 via private key 317—the verified owner-user of the content. Moreover, individual' 302 watermark or watermarked data (identity information 334) can be encrypted by digital identity authentication platform's 201 private key 317 and can be decrypted by digital identity authentication platform's 201 public key in key infrastructure 308 as a service (e.g., by news media to verify authenticity).

It is contemplated herein that private part of the key, system private key 317, is now inside the system, digital identity authentication platform 201. The public key in key infrastructure 308 can be obtained by requestor 304, the media to perform the decryption of the signature.

It is further contemplated herein that external content, information, content, personal data or watermark user's data (identity information 334), may be encrypted by individual 302 and external content may be private to the individual and not shared.

It is still further contemplated herein that individual 302, while logged in and authenticated via digital identity authentication platform 201, may view/share/encrypt/decrypt their information, external content 337, personal data or watermark user's data (identity information 334) on a third party system, server 260, or user device 220.

It is still further contemplated herein that external content 337, personal data, or watermark users data (identity information 334) may be co-authenticated by two or more individuals 302, identity editors 303 or a third party individual 302 or service (e.g. legal document) by aggregating two or more private keys 317 to encrypt.

Figure 6A:
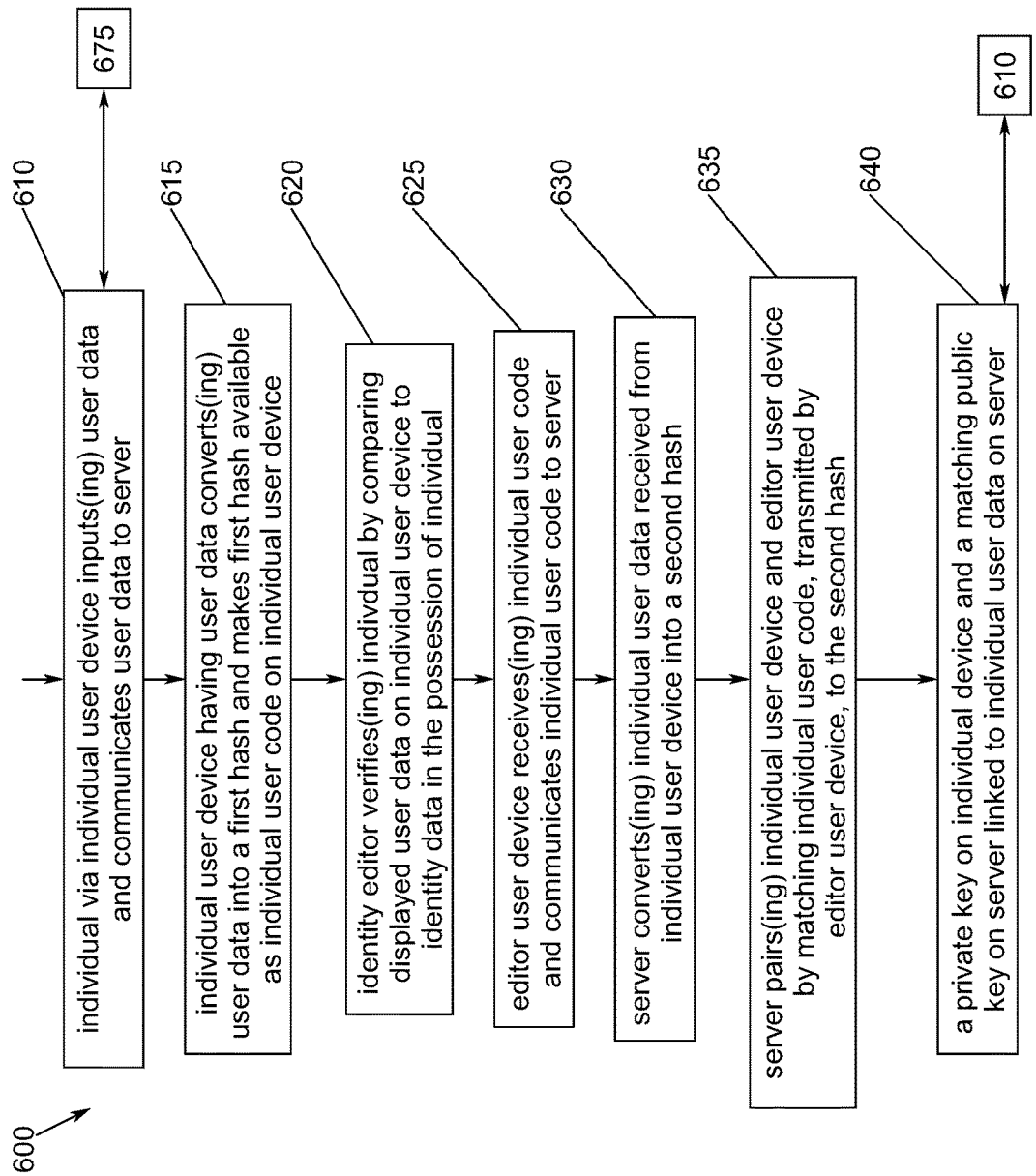
FIGS. 6A and 6B are exemplary embodiments of a flow diagram or chart of the cryptography digital identity authentication, and security steps performed by individual, identity editor, and requestor thereon digital identity authentication system or platform of FIG. 3.
Figure 6B:
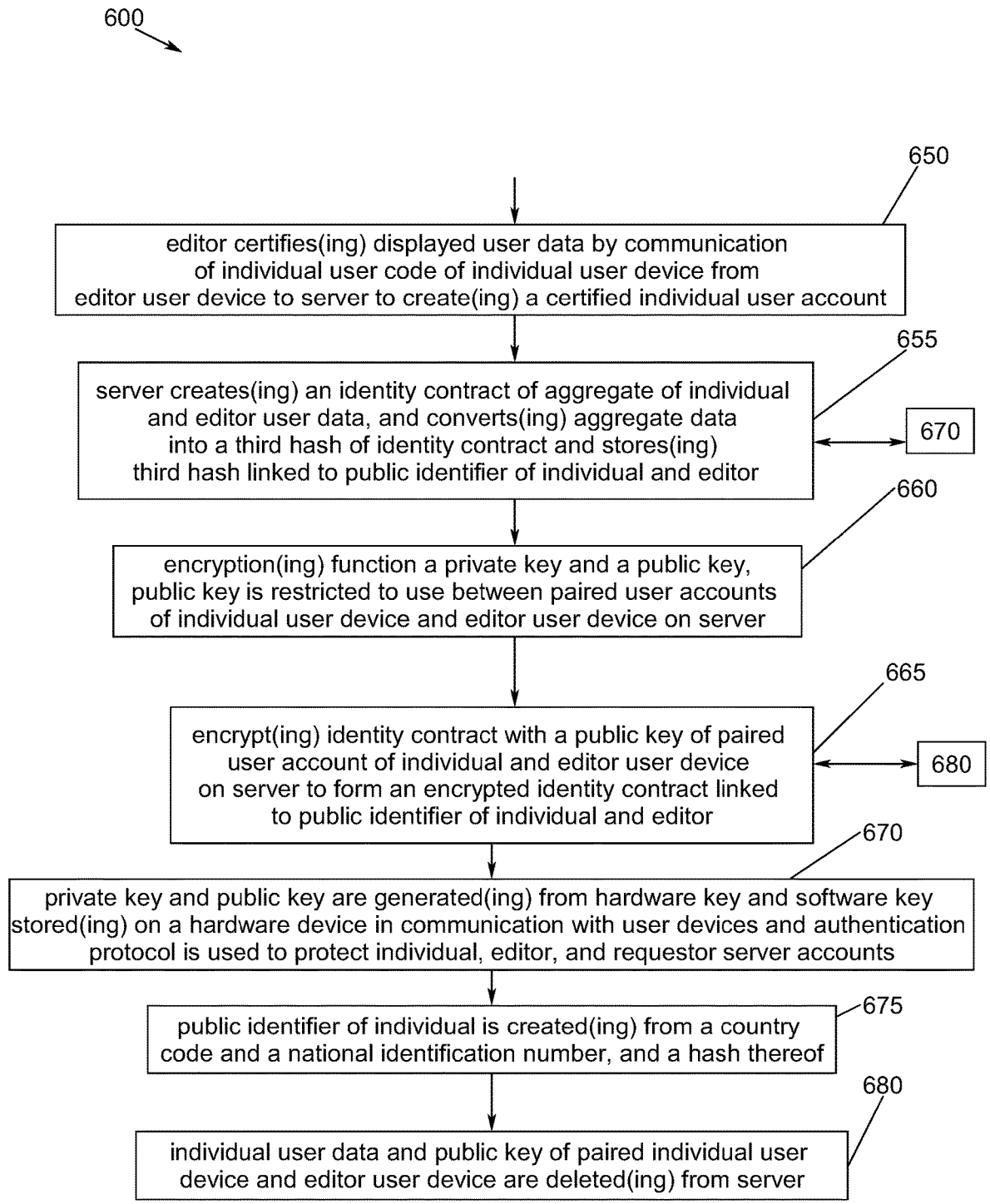

Referring again to FIGS. 3 and 4, by way of example, and not limitation, there is illustrated a set of instructions for computer system 10, user 220, 222, 224 and/or server system 260 utilizing digital identity authentication platform 201 shown in block diagram 300. Referring now to FIGS. 6A and 6B, by way of example, and not limitation, there is illustrated a flow diagram of an exemplary embodiment of digital identity authentication platform 201 model, scenario and dashboard results. Preferably, identity algorithm, software or applications 206 may include steps 600 wherein digital identity authentication platform 201 provides an identity authentication service between individual 302, identity editor 303, and requestor 304. In step 610, or processor executes an instruction where, individual 302 via user 220, individual 302 user device, inputs(ing) or retrieving user data, such as public identifier 310 and hardware key 307, or the like, of individual(s) 302 and individual 302 via user 220, individual 302 user device communicates(ing) or transmits user data to server, server system 260. In step 615, or processor executes an instruction where, individual 302 via user 220, individual 302 user device, may convert user data, such as public identifier 310 and hardware key 307, or the like, of individual(s) 302 into first hash 380.1 and first hash 380.1 may be made available or displayed on user 220 as individual 302 user code 390. In step 620, or processor executes an instruction where, identity editor 303 verifies (ing) individual 302 by comparing displayed identity data of individual 302 on user 220, individual 302 user device (or alternatively displayed on identity editor 303 user 224, identity editor 303 user device) to identify identity data, such as identity document 332 in the possession of individual 302. In step 625, or processor executes an instruction where, user 222, identity editor 303 user device, may receive or read individual 302 user code 390 and communicate or transmit individual 302 user code 390 to server, server system 260. It is contemplated herein that identity editor 303 certifies individual 302 and user code 390 via communicate(ing) or transmit(ting) individual 302 user code 390 from individual 302 user device to server to create certified individual 302 individual account (Account1) or account1 306. In step 630, or processor executes an instruction where, server, server system 260 may convert user data of individual 302 on server system 260 into second hash 380.2 of user data of individual 302 and utilize second hash 380.2 of user data of individual 302 as an identifier of user data of individual 302. In step 635, or processor executes an instruction where, server, server system 260 may assign or pair (pairing) a selected user 220, individual 302 user device, thereto user 222, identity editor 303 user device, by matching or linking individual 302 user code 390 communicated or transmitted by user 222, identity editor 303 user device to second hash 380.2 on server, server system 260. In step 640, or processor executes an instruction where, server, server system 260 may generate(ing) private key 317 on or for selected user 220, individual 302 user device, and generates a matching public key 308 on server, server system 260 and links public key 308 to individual 302 user data on server, server system 260. It is contemplated herein that private key 317 is only generated on user 220, individual 302 user device after user 220, individual 302 is paired to user 222, identity editor 303. It is further contemplated herein that processor executes an instruction where, server, server system 260 may generate (ing) private key 317 on or for paired selected user 220, individual 302 user device or user 222, identity editor 303 user device. Alternatively, in step 610 individual 302 user device generates private key 317 on or for selected users, and communicates matching public key 308 on the server, server system 260. For step 610 and 640, private key 317 and matching public key 308 may be generated from hardware key 307 or private key 317 and matching public key 308 may be generated from hardware key 307 and software key 315.

In step 650, or processor executes an instruction where, user 222, identity editor 303 user device certifies(ing) displayed identity data, such as identity document 332 by machine reading or entering individual 302 user code 390 and communicating or transmitting individual 302 user code 390 from user 222, identity editor 303 user device to server, server system 260 to create(ing) a certified individual 302 individual account (Account1) or account1 306.

Preferably, server, server system 260 pairs selected user 220, individual 302 user device, thereto user 222, identity editor 303 user device, if user code 390 (same as first hash 380.1) transmitted by user 222, identity editor 303 user device matches, same as, or equals second hash 380.2. In step 655, or processor executes an instruction where, server, server system 260 creates(ing) identity contract 351 of the aggregate of user 220, individual 302 user device, having individual 302 user data, such as public identifier 310 and hardware key 307, or the like and user 222, identity editor 303 user device, having identity editor 303 user data, such as public identifier 310 and hardware key 307, or the like, and converts(ing) aggregated data into third hash 380.3 of identity contract 351 and stores(ing) third hash 380.3 in database 270 linked to public identifier 310 of individual 302 and identity editor 303. Alternatively, in step 655, or processor executes an instruction where, server, server system 260 creates(ing) identity contract 351 of the aggregate of user 220, individual 302 user device, having user data, such as public identifier 310 and hardware key 307, or the like, and converts(ing) aggregated data into third hash 380.3 of identity contract 351 and stores(ing) third hash 380.3 in database 270 linked to public identifier 310 of individual 302 and identity editor 303.

In step 660, or processor executes an instruction where, authentication protocol 305 with an encryption function may utilize private key 317 and public key 308, where public key 308 is restricted to use between paired user accounts, selected user 220, individual 302 user device, thereto user 222, identity editor 303 user device, of user 220, individual 302 user device and user 222, identity editor 303 user device, on server, server system 260. In step 655, or processor executes an instruction to encrypts identity contract 351 with public key 308 of said paired user account paired user accounts, selected user 220, individual 302 user device, thereto user 222, identity editor 303 user device on server, server system 260 to form an encrypted identity contract 351 linked to public identifier 310 of user 220, individual 302 user device and user 222 and linked to public identifier 310 of user 222, identity editor 303 user device.

It is contemplated herein that the data may not need to be hashed. The QR code scan allows for 7000 characters or more to be transmitted. Therefore, it may be possible to just compare all data in QR code format without hashing.

In step 670, or in combination with step 655 or step 610, processor executes an instruction to generate (ing) private key 317 and public key 308 from hardware key 307 and software key 315 stored on hardware device 314 in communication with one of one or more user devices 220, 222, 224 and authentication protocol 305 is used to protect communication between user 220, individual 302 user device and individual server account, such as individual 302 account account1 306, user 222, identity editor 303 user device and editor server account, such as identity editor 303 account account2 306, and user 224, requestor 304 user device and requestor server account, such as requestor 304 account account3 306. In step 675, or as an alternate or in combination with step 610, or processor executes an instruction to create or generate(ing) public identifier 310 of individual 302 from a country code and a national identification number (e.g. Social Security Number), and a hash thereof. In step 680, or as an alternate or in combination with step 665, or processor executes an instruction to delete individual 302 user data and public key 308 of paired devices (individual 302 user device and identity editor 303 user device), selected user 220, individual 302 user device, thereto user 222, identity editor 303 user device from server, server system 260 and database 270.

It is contemplated herein that user code 390 may be machine readable code, a bar code, QR code, or the like and identity editor 303 user 224, identity editor 303 user device may be an optical scanning device.

It is further contemplated herein that user code 390 may be transmitted through wireless communication and user 224, identity editor 303 user device may have a wireless receiver.

It is still further contemplated herein that location, a date and a time of user code 390 transmission may be passed, communicated, or transmitted from user 224, identity editor 303 user device to server, server system 260.

Figure 7:
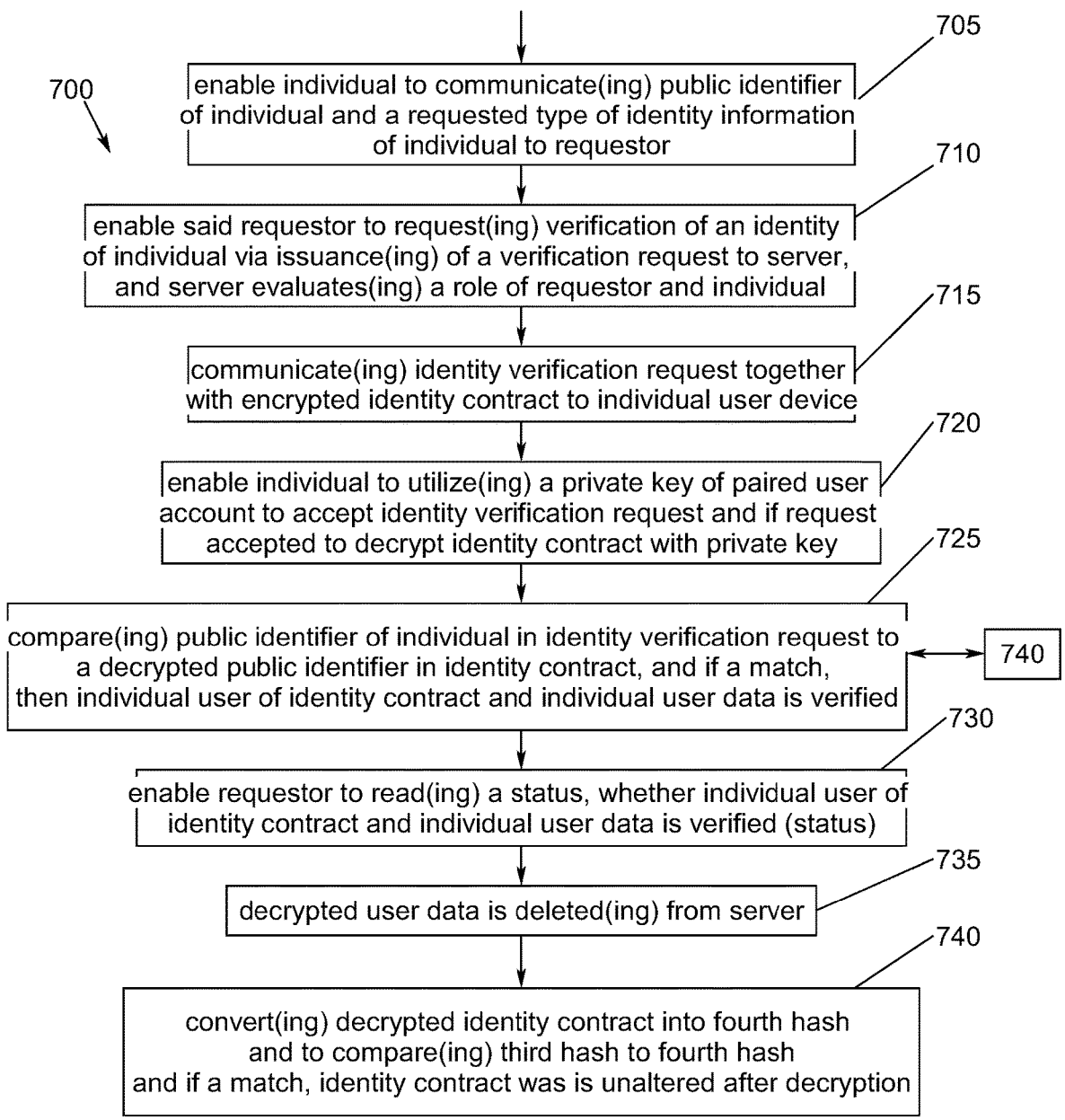
FIG. 7 is an exemplary embodiment of a flow diagram or chart of the digital identity authentication steps performed by individual, identity editor, and requestor thereon digital identity authentication system or platform of FIG. 3.

Referring again to FIG. 7, by way of example, and not limitation, there is illustrated a flow diagram of an exemplary embodiment of digital identity authentication platform 201 decrypting individual 302 identity. Preferably, identity algorithm, software or applications 206 may include steps 500 wherein digital identity authentication platform 201 provides an identity authentication service between individual 302, identity editor 303, and requestor 304. In step 705, or processor executes an instruction to enable individual 302 via user 220, individual 302 user device to communicate(ing) public identifier 310 of individual 302 and a requested type of identity information 334 of individual 302 to requestor 304 via user 224, requestor 304 user device. Moreover, as an alternate variant of step 705 or processor executes an instruction to provide a hidden non-public identifier 313 linked to public identifier 310 to requestor 304 via user 224, requestor 304 user device. Moreover, processor executes an instruction to display each public identifier 310, type of event, and timestamp 345 publicly on dashboard 335.

In step 710, or processor executes an instruction to enable requestor 304 via user 224, requestor 304 user device to request(ing) verification (identity verification) of an identity of individual 302 via issuance of a verification request (challenge) 360 to server, server system 260, and server, server system 260 evaluates a role of requestor 304 and individual 302. In step 715, or processor executes an instruction to communicate(ing) verification request (challenge) 360 together with encrypted identity contract 351 to user 220, via individual 302 user device. In step 720, or processor executes an instruction to enable individual 302 via user 220, individual 302 user device to utilize(ing) private key 317 of paired user account, selected user 220, individual 302 user device and user 222, identity editor 303 user device to accept identity verification request, verification request (challenge) 360 and if identity verification request, verification request (challenge) 360 is accepted to decrypt identity contract 351 with private key 317 via user 220, individual 302 user device. In step 725, or processor executes an instruction to compare(ing) public identifier 310 of individual 302 in identity verification request, verification request (challenge) 360 to decrypted public identifier 310 in identity contract 351, and if a match, individual 302 of identity contract 351 and individual 302 user data, such as public identifier 310 and hardware key 307, or the like is verified. In step 730, or processor executes an instruction to enable requestor 304 via user 224, requestor 304 user device to read a status whether individual 302 user of identity contract 351 and individual 302 user data is verified, step 725.

In step 735, or processor executes an instruction to delete decrypted identity data, such as public identifier 310, identity contract 351, individual 302 identity, of individual 302 from server, server system 260 and database 270. In step 740, or as an alternate or in combination with step 725, processor executes an instruction to convert(ing) decrypted identity contract 351 into fourth hash 380.4 of decrypted identity contract 351 and stores(ing) fourth hash 380.4 in database 270 linked to public identifier 310 of individual 302 and identity editor 303. Moreover, processor executes an instruction to compare(ing) third hash 380.3 and fourth hash 380.4, and if a match, identity contract 351 was not altered (unaltered) after decryption and individual 302 of identity contract 351 and individual 302 user data, such as public identifier 310 and hardware key 307, or the like is verified. It is contemplated herein that compare(ing) third hash 380.3 and fourth hash 380.4 ensures an added layer of protection that the message is not tampered with (by a jail broken user device, or during transmission) before it is sent back to the account.

It should be noted that various other alternatives, adaptations, and modifications may be made within the scope of the present disclosure. As an example in the above embodiment, the public key 308 encrypts and the private key 317 decrypts or may be utilized to perform such steps or instructions. As we noted in asymmetric cryptography section, the functions can be reversed at the expense of some performance: A private key 317 may be utilized to encrypt and a public key 308 may be utilized to decrypt. Therefore it is straightforward to those skilled in the art that we would encrypt the identity contract 351 in step 665 with the private key 317 of the paired user account and then later in step 720 decrypt with the public key 308. Similarly, in encryption-decryption process only the hashes 380 could be exchanged between user device (individual 302 user device and user 222, identity editor 303 user device) and server, server system 260.

The foregoing description and drawings comprise illustrative embodiments of the present disclosure. Having thus described exemplary embodiments, it should be noted by those of ordinary skill in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail; it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

What is claimed is:

1. A system for digital identity authentication, said system comprising:
a server;
one or more user devices, each of said one or more user devices having a user data, said user data including a public identifier and a hardware key identifying each said user device, each of said one or more user devices communicates said user data to said server;
a private key on an individual user device and a matching public key on said server linked to an individual user data on said server;
an individual user device converts said individual user data into an individual user code on said individual user device;
an editor user device receives said individual user code and communicates said individual user code to said server; and
said server pairs said individual user device and said editor user device by matching said individual user code transmitted by said editor user device to said user data on said server.

2. The system of claim 1, further comprising at least one processor, at least one memory including a computer program, and a visual display to display an instruction, said at least one memory and said computer program configured to, with said at least one processor, configure the system to register an individual defined by a public identifier of said individual and issues said individual access to an individual server account on said server.

3. The system of claim 2, wherein said processor executes an instruction to register an identity editor defined by a public identifier of said identity editor and issues said identity editor access to an editor server account on said server.

4. The system of claim 3, wherein said processor executes an instruction to register a requestor defined by a public identifier of said requestor and issues said requestor access to a requestor server account on said server.

5. The system of claim 4, wherein said individual device displays an identity data of said individual and said editor verifies said displayed identity data via comparison to an identity document in the possession of said individual.

6. The system of claim 5, wherein said editor certifies said displayed identity data by communication of said individual user code of said individual user device from said editor user device to said server to create a certified individual user account.

7. The system of claim 6, wherein said processor executes an instruction to create an identity contract formed by an aggregate of said individual user data and an editor user data, and converts said aggregate of said individual user data and said editor user data into a third hash of said identity contract and stores said third hash of said identity contract linked to said public identifier of said individual and linked to said the public identifier of said editor.

8. The system of claim 7, further comprising an authentication protocol with an encryption function having a private key and a public key, said public key is restricted to use between user accounts of paired said individual user device and said editor user device on said server.

9. The system of claim 8, wherein said processor executes an instruction to encrypt said identity contract with a public key of said user accounts of paired said individual user device and said editor user device on said server to form an encrypted identity contract linked to said public identifier of said individual and linked to said public identifier of said editor.

10. The system of claim 9, wherein said processor executes an instruction to enable said individual to communicate said public identifier of said individual and a requested type of an identity information of said individual to said requestor.

11. The system of claim 10, wherein said processor executes an instruction to enable said requestor to request verification of an identity of said individual via issuance of a verification request to said server, and wherein said server evaluates a role of said requestor and said individual.

12. The system of claim 11, wherein said processor executes an instruction to communicate said identity verification request together with said encrypted identity contract to said individual user device.

13. The system of claim 12, wherein said processor executes an instruction to enable said individual to utilize a private key of said user accounts of paired said individual user device and said editor user device to accept said identity verification request and if said identity verification request is accepted to decrypt said identity contract with said private key.

14. The system of claim 13, wherein said processor executes an instruction to compare said public identifier of said individual in said identity verification request to a decrypted public identifier in said identity contract and if a match, said individual of said identity contract and said individual user data is verified.

15. The system of claim 14, wherein said processor executes an instruction to enable said requestor to read a status whether said individual of said identity contract and said individual user data is verified.

16. The system of claim 15, wherein said processor executes an instruction to provide insurance thereto said individual and said requestor for a false positive identification of said individual.

17. The system of claim 10, wherein said individual provides a non-public hidden identifier linked to said public identifier to said requestor.

18. The system of claim 1, further comprising a dashboard to display each said public identifier, a type of event, and a timestamp publicly.

19. The system of claim 1, wherein said user code is a machine readable code.

20. The system of claim 19, wherein said user code is a bar code or a QR code and the editor user device is an optical scanning device.

21. The system of claim 20, wherein said user code is transmitted through wireless communication and said editor user device has a wireless receiver.

22. The system of claim 1, wherein a location, a date and a time of said user code are passed from said editor user device to said server.

23. The system of claim 1 wherein said private key on said individual user device and said matching public key on said server are generated from said hardware key on said individual user device.

24. The system of claim 2 wherein said public identifier of said individual is created from a country code and a national identification number, and a hash thereof.

25. The system of claim 9, wherein said individual user data and said public key of said user accounts of paired said individual user device and said editor user device are deleted from said server.

26. The system of claim 14, wherein said identity data is deleted from said server.

27. The system of claim 1, wherein said individual user code is said user data.

28. The system of claim 1, wherein said individual user code is a hash of said user data.

29. The system of claim 1, wherein said individual user code is encrypted during data transmission.

30. The system of claim 13, further comprising a fourth hash is generated from said decrypted identity contract and transmitted to said server and compared to said third hash, and if a match, said identity contract is unaltered after decryption.

31. The system of claim 8, wherein said processor executes an instruction to encrypt said identity contract with a private key of said user accounts of paired said individual user device and said editor user device on said individual user device to form an encrypted identity contract linked to said public identifier of said individual and linked to said public identifier of said editor.

32. The system of claim 12, wherein said processor executes an instruction to enable said individual to utilize a private key of said user accounts of paired said individual user device and said editor user device to accept said identity verification request and if said identity verification request is accepted to decrypt said identity contract with said public key.

* * * * *